(12) United States Patent
Kenney

(10) Patent No.: US 11,876,203 B2
(45) Date of Patent: Jan. 16, 2024

(54) HEAT EXCHANGER WITH INTEGRATED SUPPORT STRUCTURE

(71) Applicant: Dana Canada Corporation, Oakville (CA)

(72) Inventor: Benjamin Kenney, Oakville (CA)

(73) Assignee: DANA CANADA CORPORATION, Oakville (CA)

( * ) Notice: Subject to any disclaimer, the term of this patent is extended or adjusted under 35 U.S.C. 154(b) by 139 days.

(21) Appl. No.: 16/152,974

(22) Filed: Oct. 5, 2018

(65) Prior Publication Data

US 2019/0109357 A1    Apr. 11, 2019

Related U.S. Application Data

(60) Provisional application No. 62/569,373, filed on Oct. 6, 2017.

(51) Int. Cl.
*H01M 10/6556* (2014.01)
*F28D 1/03* (2006.01)
(Continued)

(52) U.S. Cl.
CPC ...... *H01M 10/6556* (2015.04); *F28D 1/0383* (2013.01); *F28F 3/12* (2013.01);
(Continued)

(58) Field of Classification Search
CPC ...... F28F 3/00; F28F 3/12; F28F 9/001; F28F 2230/00; F28D 1/03; F28D 1/0383;
(Continued)

(56) References Cited

U.S. PATENT DOCUMENTS 4,478,277 A    10/1984  Friedman et al.
5,038,858 A *  8/1991  Jordan ............. H01L 23/3672
                                                       165/185
(Continued)

FOREIGN PATENT DOCUMENTS

CN     206441784 U    8/2017
JP     2006329439 A * 12/2006 ............. F28F 3/12

OTHER PUBLICATIONS

JP-2006329439-A MT (Year: 2006).*
(Continued)

*Primary Examiner* — Gordon A Jones
(74) *Attorney, Agent, or Firm* — McCoy Russell LLP

(57) ABSTRACT

A heat exchanger having an integrated support structure particularly suited for thermal management of heat generating components such as battery thermal management applications or thermal management of other electronic components is disclosed. The heat exchanger includes a top plate and a base tray defining a plurality of fluid channels that extend between an inlet manifold area and an outlet manifold area. The top plate has a first side defining a primary heat transfer area and a second side for effecting a sealing relationship between the top plate and the base tray. In some instances, the top plate includes a thermally conductive material while the base tray includes a non-thermally conductive material. In some instances the base tray cooperates with a cover portion to define an enclosure for housing the heat generating components.

17 Claims, 18 Drawing Sheets

(51) Int. Cl.

| | |
|---|---|
| *F28F 21/00* | (2006.01) |
| *F28F 9/00* | (2006.01) |
| *H01M 50/209* | (2021.01) |
| *H01M 50/271* | (2021.01) |
| *H01M 10/613* | (2014.01) |
| *H01M 10/625* | (2014.01) |
| *H01M 10/6554* | (2014.01) |
| *H01M 10/6568* | (2014.01) |
| *F28F 3/12* | (2006.01) |
| *F28D 21/00* | (2006.01) |

(52) U.S. Cl.
CPC ............ *F28F 9/001* (2013.01); *F28F 21/00* (2013.01); *H01M 10/613* (2015.04); *H01M 10/625* (2015.04); *H01M 10/6554* (2015.04); *H01M 10/6568* (2015.04); *H01M 50/209* (2021.01); *H01M 50/271* (2021.01); *F28D 2021/0028* (2013.01); *F28D 2021/0043* (2013.01); *F28F 2230/00* (2013.01); *F28F 2270/00* (2013.01)

(58) Field of Classification Search
CPC .... F28D 2021/0028; F28D 2021/0043; H01M 10/6556; H01M 10/6568
See application file for complete search history.

(56) References Cited

U.S. PATENT DOCUMENTS

| | | | |
|---|---|---|---|
| 5,836,383 A | 11/1998 | Zwittig | |
| 6,305,463 B1* | 10/2001 | Salmonson | G06F 1/20 165/185 |
| 6,833,991 B2* | 12/2004 | Van Gaal | H05K 7/206 165/185 |
| 7,173,823 B1* | 2/2007 | Rinehart | F28F 21/065 165/80.4 |
| 7,427,156 B2 | 9/2008 | Ambrosio et al. | |
| 7,807,312 B2 | 10/2010 | Brantley et al. | |
| 8,811,015 B2* | 8/2014 | Wagner | H02M 7/003 361/702 |
| 9,437,903 B2 | 9/2016 | Dekeuster | |
| 9,531,045 B2 | 12/2016 | Girmscheid et al. | |
| 9,896,822 B2* | 2/2018 | Kohno | H01M 50/20 |
| 10,619,946 B2* | 4/2020 | Meshenky | F28F 9/001 |
| 2009/0258289 A1* | 10/2009 | Weber | H01M 10/651 429/120 |
| 2014/0090811 A1* | 4/2014 | Schmid | H01M 10/66 165/104.19 |
| 2014/0090813 A1 | 4/2014 | Schmid et al. | |
| 2015/0034287 A1* | 2/2015 | Otto | F28F 3/12 165/168 |
| 2016/0025428 A1 | 1/2016 | Hendrix et al. | |
| 2016/0036104 A1* | 2/2016 | Kenney | H01M 10/6557 429/120 |
| 2016/0049705 A1* | 2/2016 | Mahe | F28F 21/065 429/120 |
| 2016/0064134 A1* | 3/2016 | Yeo | H01F 27/08 336/61 |
| 2018/0164002 A1 | 6/2018 | Spillner et al. | |
| 2018/0166621 A1 | 6/2018 | Ranalli et al. | |
| 2018/0166758 A1 | 6/2018 | Thomas | |

OTHER PUBLICATIONS

Candian Intellectual Property Office, International Search Report with Written Opinion Issued in Application PCT/CA2018/051257, 9 pages, Canadian Intellectual Property Office, Quebec, CA.

* cited by examiner

HEAT EXCHANGER WITH INTEGRATED SUPPORT STRUCTURE

FIELD

This disclosure relates generally to heat exchangers having an integrated support structure. In particular, this disclosure relates to heat exchangers having an integrated support structure particularly suited for thermal management of heat generating components such as battery thermal management applications or thermal management of other electronic components.

BACKGROUND

Rechargeable batteries such as batteries made up of many lithium-ion cells can be used in many applications, including for example, electric propulsion vehicle ("EV") and hybrid electric vehicle ("HEV") applications. Lithium-ion batteries in electric or hybrid electric vehicles typically generate large amounts of heat that needs to be dissipated in order to ensure proper functioning of the batteries and to extend their service life.

Liquid cooled heat exchangers are used to manage the thermal load of these types of batteries. In general, cold plate heat exchangers are heat exchangers upon which a stack of adjacent battery cells, or battery cell containers that each house one or more battery cells, are arranged for cooling and/or regulating the temperature of the overall battery unit. In these applications, the individual battery cells, or battery cell containers, are generally arranged adjacent to each other in face-to-face or surface-to-surface contact with each other to form the battery stack, the battery stack being arranged on top of the cold plate heat exchanger such that an end face or end surface of each battery cell or battery cell container is in surface-to-surface contact with a surface of the heat exchanger.

The battery packs, including the cold plate heat exchanger, are often arranged within a plastic tray or plastic support structure when installed within an electric vehicle. The need for a separate support structure when installing the battery packs with cold plate heat exchanger in the electric vehicle often adds to the overall cost. This is also true for heat exchangers used for thermal management applications other than the cooling of battery packs.

Another emerging difficulty with heat exchangers in electric vehicle applications, in particular for cold plate heat exchangers, is the ever increasing size of the cold plates required to accommodate the many lithium ion cells or other batteries and/or electronic equipment installed within the vehicle. Large heat exchangers that are able to accommodate a large number of battery cells, or other electronic equipment or components, stacked thereon are being favoured over multiple, smaller heat exchangers so as to minimize the number of required coolant connections as well as in an effort to minimize costs. However, brazing very large heat exchangers is often difficult due to the large thermal gradient that is created as the large heat exchanger traverses the length of the brazing oven making it difficult to create a leak free structure that also meets flatness tolerances.

Accordingly, heat exchangers that minimize the overall number of components and/or parts and that facilitate installation for a particular application are desirable. As well, heat exchangers specifically adapted for cold plate applications that can accommodate large number of battery cells or battery cell containers and that can still meet manufacturing and performance requirements and that can also help to reduce costs are desirable. Therefore, heat exchangers that help to reduce the number of components required for mounting and/or installing the heat exchanger within the vehicle, when used for automobile applications, which can also contribute to improved overall costs are particularly desirable.

SUMMARY

In accordance with an example embodiment of the present disclosure there is provided a heat exchanger, comprising: a top plate; and a base tray defining a plurality of fluid channels extending between an inlet manifold area and an outlet manifold area for the flow of a heat exchange fluid; the top plate having a first side defining a primary heat transfer area and a second side, opposite to the first side, for effecting a sealing relationship between the top plate and the base tray and enclosing the plurality of fluid channels such that the plurality of fluid channels are defined between a bottom surface of the base tray and the second side of the top plate; and wherein the top plate is comprised of a first thermally conductive material and the base tray is comprised of a second, non-thermally conductive material.

In accordance with an example embodiment of the present disclosure there is provided a heat exchanger, comprising: a base tray having a bottom wall and a sidewall extending generally perpendicular to the bottom wall and surrounding the bottom wall, wherein the base tray includes: a cooling medium flow path area comprising a plurality of fluid channels, wherein the plurality of fluid channels extend between an inlet manifold area and an outlet manifold area for the flow of a heat exchange fluid through the heat exchanger; and a peripheral flange area extending from and surrounding the cooling medium flow path area; a top plate having a first side defining a primary heat transfer area for receiving one or more heat-generating components and a second side, opposite to the first side, for effecting a sealing relationship between the top plate and an inside surface of the base tray for enclosing the plurality of fluid channels defined within the cooling medium flow path area; and a cover portion configured for disposition in sealing relationship with the base tray such that the cover portion and base tray together define an open interior space for housing the heat-generating components disposed on the top plate, the cover portion having a sealing surface disposed in face-to-face sealing relationship with the peripheral flange of the base tray.

In accordance with an example embodiment of the present disclosure there is provided a battery enclosure comprising: base tray having a bottom wall and a sidewall extending generally perpendicular to the bottom wall and surrounding the bottom wall; a cover portion configured for disposition in sealing relationship with the base tray such that the cover portion and base tray together define an open interior space for housing one or more rechargeable battery units; wherein the base tray includes a cooling medium flow path area defined within the bottom wall of the base tray, the battery enclosure further comprising: a top plate having a first side defining a primary heat transfer area for receiving the one or more one or more rechargeable battery units and a second side, opposite to the first side, for effecting a sealing relationship between the top plate and an inside surface of the base tray for enclosing the cooling medium flow path area; a fluid inlet passage disposed within the base tray for inletting a heat exchange fluid into the cooling medium flow path area; and a fluid outlet passage disposed within the base tray for discharging the heat exchange fluid from the cooling medium flow path area.

In accordance with an example embodiment of the present disclosure there is provided a cold plate heat exchanger, comprising: a base tray defining a plurality of fluid channels wherein the base tray is comprised of a plastic material; a top plate having a first side defining a battery-contacting area and a second side for effecting a sealing relationship between the top plate and the base tray and enclosing the fluid channels, wherein the top plate is comprised of a thermally conductive material; a plurality of connecting structures which together provide a rigid, or substantially rigid, connection between the top plate and the base tray effecting a fluid tight, or substantially fluid tight seal, between the top plate and the base tray; wherein each of the connecting structures comprises at least a first connecting element and a second connecting element, wherein the first connecting element is associated with the base tray and the second connecting element is associated with the top plate.

In accordance with another aspect of the present disclosure there is provided a cold plate heat exchanger wherein the base tray comprises: a cooling area, the plurality of fluid channels disposed within the cooling area; and a peripheral flange area extending from and surrounding the cooling area; and the top plate comprises: a planar, or substantially planar, battery-contacting area; and a peripheral flange area extending from and surrounding the battery-contacting area.

In accordance with another aspect of the present disclosure there is provided a cold plate heat exchanger wherein the fluid channels are defined by a plurality of ribs extending from a base wall of the base tray, the ribs disposed at spaced-apart intervals along the width of the cooling area.

In accordance with another aspect of the present disclosure there is provided a cold plate heat exchanger wherein the first connecting element comprises a projecting portion and the second connecting element comprises a receiving portion, wherein the projecting portion is comprised of plastic and is integrally formed with the base tray.

In accordance with another aspect of the present disclosure there is provided a cold plate heat exchanger wherein the receiving portion comprises a plurality of spaced apart openings disposed about the peripheral flange area of top plate.

In accordance with another aspect of the present disclosure there is provided a cold plate heat exchanger wherein the first and second connecting elements are secured together by crimping of the projecting portion over the peripheral flange area of the top plate.

In accordance with another aspect of the present disclosure there is provided a cold plate heat exchanger wherein the first connecting element effects a compressive force of the top plate against the base tray.

In accordance with another aspect of the present disclosure there is provided a cold plate heat exchanger wherein the connecting structures further comprise a third connecting element separate to the top plate and base tray, wherein the first and second connecting elements together define a receiving portion and the third connecting element comprises a fastener configured to be received within the receiving portion.

In accordance with another aspect of the present disclosure there is provided a cold plate heat exchanger wherein the third connecting elements exerts a compressive force on said top plate against the base tray.

In accordance with another aspect of the present disclosure there is provided a cold plate heat exchanger wherein the first connecting element comprises a plurality of openings disposed about the peripheral flange area at spaced apart intervals and along the ribs defining the plurality of fluid channels; and the second connecting element comprises a plurality of openings disposed within the battery-contacting area in spaced apart, longitudinal rows corresponding to the ribs disposed in the cooling area of base tray.

In accordance with another aspect of the present disclosure there is provided a cold plate heat exchanger further comprising heat transfer enhancements disposed within the fluid channels.

In accordance with another aspect of the present disclosure there is provided a cold plate heat exchanger wherein the heat transfer enhancements comprise one of the following alternatives: turbulizers or offset strip fins.

In accordance with another aspect of the present disclosure there is provided a cold plate heat exchanger wherein the heat transfer enhancements comprise projections extending from the second side of the top plate such that when the top plate is disposed on the base tray, the projections extend into the fluid channels defined by the ribs in the cooling area of the base tray.

In accordance with another aspect of the present disclosure there is provided a cold plate heat exchanger wherein the projections comprise spaced apart, oppositely angled ribs disposed longitudinally along the fluid channels.

In accordance with another aspect of the present disclosure there is provided a cold plate heat exchanger further comprising heat transfer enhancement-receiving grooves disposed within the fluid channels and configured for receiving the projections extending from the second side of the top plate when the top plate is disposed on the base tray.

In accordance with another aspect of the present disclosure there is provided a cold plate heat exchanger further comprising a sealing member disposed between the base tray and the top plate.

In accordance with another aspect of the present disclosure there is provided a cold plate heat exchanger wherein the base tray has a thickness that is greater than the thickness of the top plate.

In accordance with another aspect of the present disclosure there is provided a cold plate heat exchanger wherein the thermally conductive material is aluminum or an aluminum alloy.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
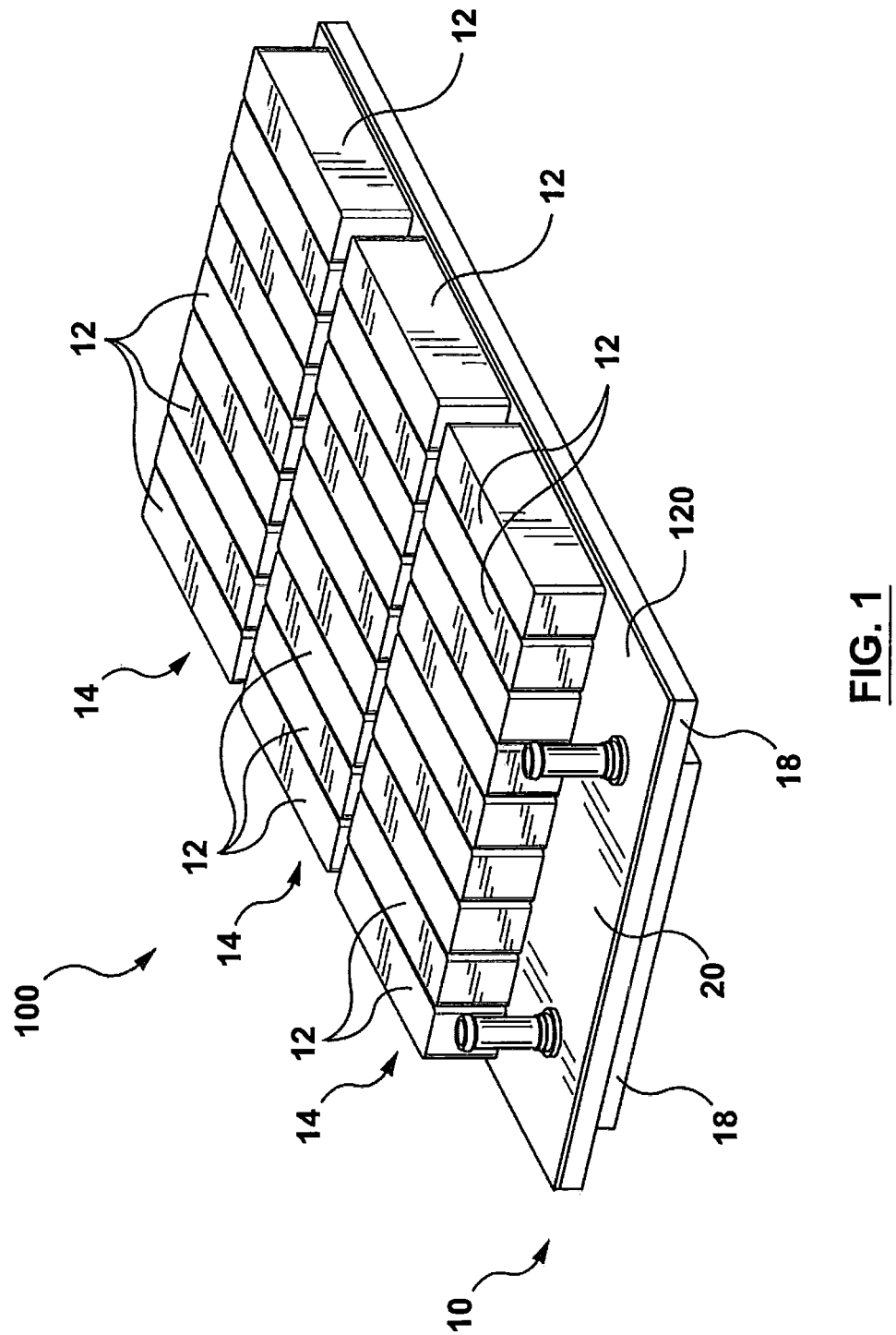
FIG. 1 is a perspective view of a rechargeable battery unit with a schematic representation of a heat exchanger according to an example embodiment of the present disclosure.
Figure 2:
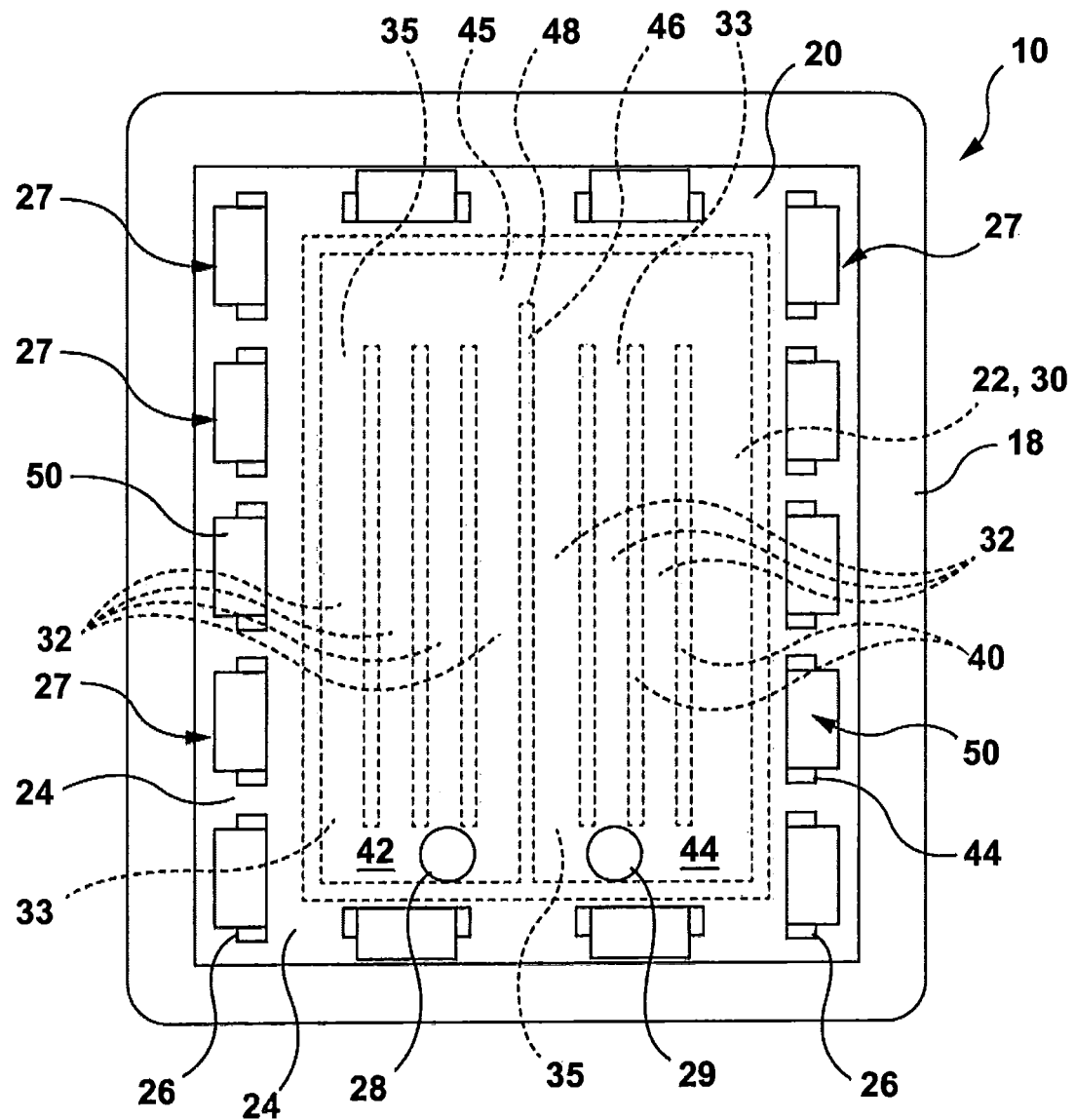
FIG. 2 is a top plan view of a heat exchanger according to an example embodiment of the present disclosure.
Figure 3:
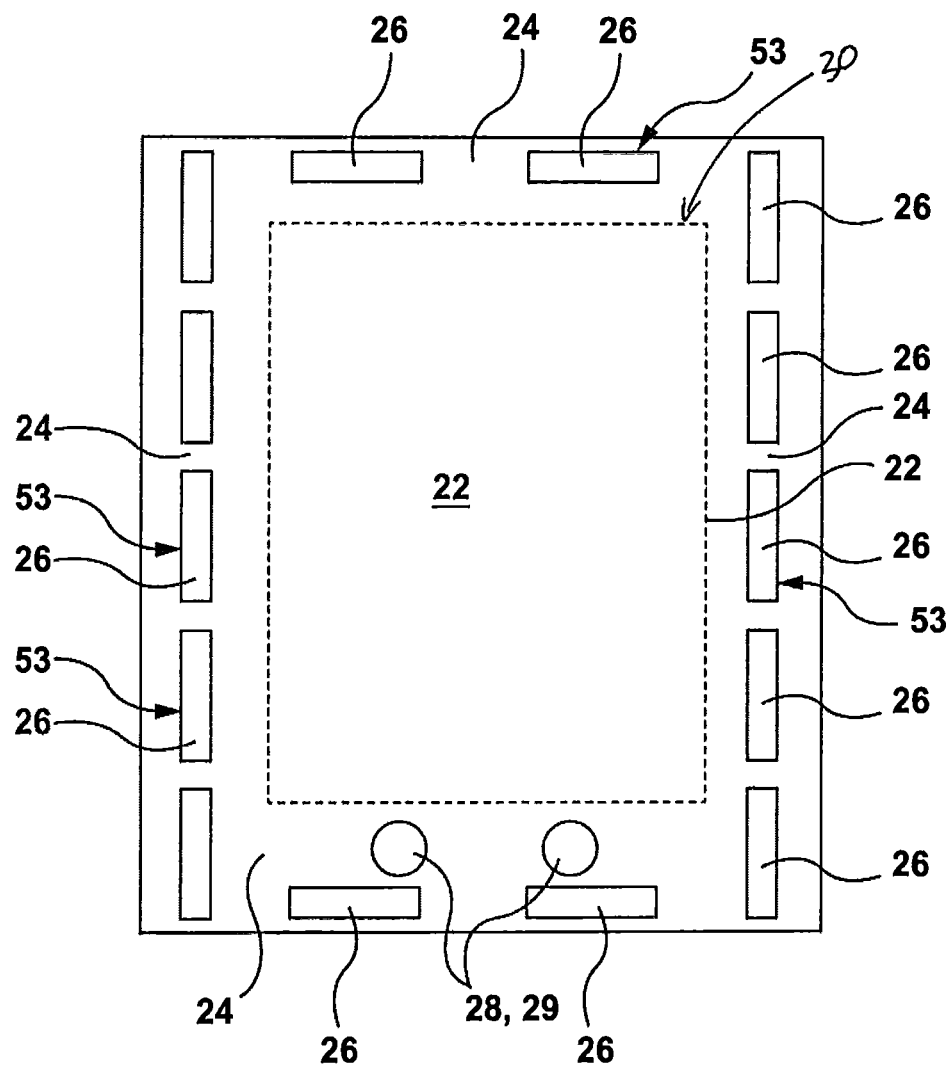
FIG. 3 is a top plan view of a top sheet for the heat exchanger of FIG. 2.
Figure 4:
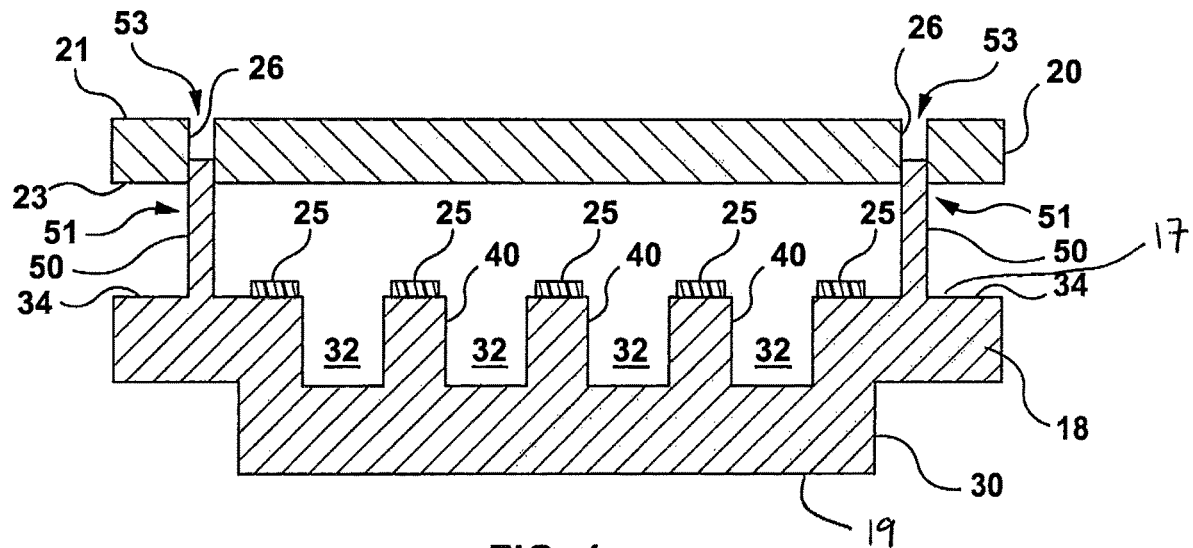
FIG. 4 is a schematic, exploded cross-sectional view through a heat exchanger of the type shown in FIG. 2 prior to assembly.
Figure 5:
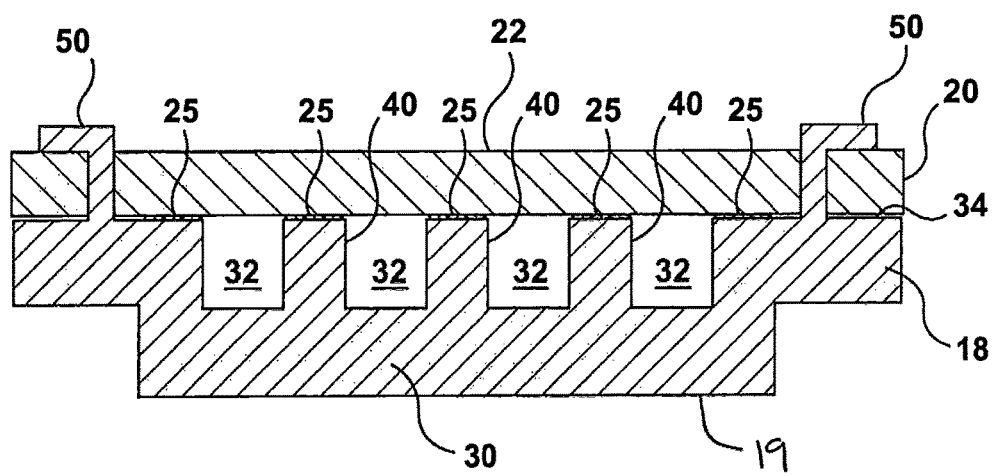
FIG. 5 is a schematic, cross-sectional view through a heat exchanger of the type shown in FIG. 2 after assembly.

Referring to FIG. 1 there is shown an illustrative example of a rechargeable battery unit 100 with a heat exchanger 10. The battery unit 100 is made up of a series of individual battery cells 12 (or battery cell containers that may each house one or more battery cells) forming a plurality of battery stacks 14. In some embodiments, for example, the plurality of battery cells 12, or battery cell containers, in each stack 14 are arranged adjacent to one another in face-to-face or surface-to-surface contact with each other. In some embodiments, for example, the heat exchanger 10 is referred to as a cold plate heat exchanger and, as shown, is arranged underneath the one or more battery stacks 14 such that an end face or end surface of each battery cell or battery cell container 12 is in surface-to-surface contact with a primary heat transfer surface 16 of the heat exchanger 10.

In general, heat exchangers used for cold plate applications for rechargeable battery units in EV and HEV's include at least a base plate and a cover plate, and in some embodiments intervening plates, which together enclose fluid channels for the flow of a cooling medium. In these applications, the heat exchangers are often mounted on a separate, external support structure when installed within the vehicle. In these example embodiments, the separate, external support structure serves as a platform for supporting the span of the heat exchanger and the plurality of battery stacks that are, in turn, stacked on top of the heat exchanger. The separate, external support structure serves to support the weight of the plurality of battery stacks positioned on top of the heat exchanger and also provides support to the heat exchanger itself which, is often a large, generally flat plate having a large surface area, the heat exchanger being subject to stresses and vibrations when in use and installed within the vehicle. The separate, external support structure can also be tailored to the specific space constraints within the vehicle compartment in which the heat exchanger and battery packs are installed. The separate, external support structures can, in some instances, have complex structures and can add to the overall cost of the cold plate heat exchanger itself. Heat exchangers requiring separate, external support structures are also used for applications other than for battery thermal management of rechargeable battery units in EV and HEV's, the separate external support structure also adding to the overall cost of the heat exchangers in these other applications.

Referring now to FIGS. 2-5 there is shown an example embodiment of a heat exchanger 10 according to the present disclosure. In the subject example embodiment, the heat exchanger 10, which in the subject example embodiment may be used as a cold plate heat exchanger for thermal management of rechargeable battery units, comprises a base tray 18 and a top plate 20. The top plate 20 is disposed on top of the base tray 18 in face-to-face relationship with the base tray 18 so as to effect a sealing relationship therebetween. The top plate 20 is comprised of a first, thermally conductive, material such as aluminum or an aluminum alloy. As used herein, the term "aluminum" is intended to include aluminum and its alloys.

The top plate 20 has a first side 21 that defines a primary heat transfer area 22, which in the subject example embodiment may be considered a battery-contacting area, that provides a planar, or substantially planar, surface upon which auxiliary components may be arranged. In the subject example embodiment, the primary heat transfer area 22 provides a planar, or substantially planar, surface upon which the individual battery cells or battery cell containers 12 are stacked. The primary heat transfer area 22 is surrounded by a peripheral flange area 24. The primary heat transfer area 22 serves as the primary heat transfer surface 16 for the heat exchanger 10 with the peripheral flange area 24 generally extending beyond or away from the primary heat transfer area 22.

The top plate 20 further comprises a second side 23, opposite to the first side 21, which is configured for sealing contact, or substantially sealing contact, with the base tray 18 when the top plate 20 is positioned on top of the base tray 18. In some embodiments, for example, in order to effect the sealing relationship at the interface of the base tray 18 and top plate 20, a sealing member 25, for example a sealing gasket, may be disposed between the base tray 18 and the second side 23 of the top plate 20 for effecting a fluid tight, or substantially fluid tight seal, therebetween. The sealing member 25 may comprise a plurality of individual sealing components arranged on each of the sealing surfaces associated with the base tray 18 that form the interface between the base tray 18 and top plate 20. Alternatively, the sealing member 25 may be a single, unitary structure that overlies each of the sealing surfaces associated with the base tray 18 that form the interface between the base tray 18 and top plate 20.

In the subject embodiment, inlet and outlet openings 28, 29 are formed at one end of the top plate 20 outside of the primary heat transfer or battery or component-contacting area 22. While the inlet and outlet openings 28, 29 are shown as being disposed at one end of the top plate 20, it will be understood that the inlet and outlet openings 28, 29 may be disposed one at each opposite end of the top plate 20 or that the inlet and outlet openings 28, 29 may be disposed at any location suitable for the particular application of the heat exchanger 10 and/or the desired flow path through the heat exchanger 10 for a particular application. Accordingly, it will be understood that the specific location of the inlet and outlet fittings 28, 29 will depend on the desired flow path through the heat exchanger 10 as well as the desired locations for the inlet and outlet fittings (not shown) for a particular application.

In some embodiments, for example, base tray 18 is comprised of a second, material such as an organic polymeric material (i.e. "plastic"), for example, a thermoplastic. Accordingly, in some embodiments, base tray 18 is not thermally conductive, the heat exchanger 10 therefore relying on the thermal conductive properties of the top plate 20 for conducting heat from/to the battery cells 12 (or other electronic components) stacked on and in surface-to-surface contact with the top plate 20 of the heat exchanger 10. In some embodiments, for example, the second material may include cast aluminum. However, in such cases, the heat exchanger 10 would still primarily rely on the thermal conductive properties of the top plate 20 for cooling (or warming) the plurality of battery packs or units or other electronic components stacked thereon.

In some embodiments, for example, base tray 18 has a first side 17 that defines a cooling medium flow path area 30 comprising a plurality of fluid channels 32 and a second, opposite side 19. The cooling medium flow path area 30 in the base tray 18 generally corresponds in size to the primary heat transfer area 22 defined by top plate 20. The cooling medium flow path area 30 is surrounded by a peripheral flange area 34 that extends beyond or away from the cooling medium flow path area 30. Therefore, when the top plate 20 is disposed on top of the base tray 18, the first side 17 of the base tray 18 is disposed in face-to-face relationship with the second side or underside of the top plate 20 such that the cooling medium flow path area 30 is aligned with, or substantially aligned with, the underside of the primary heat transfer area 22 defined by the top plate 20, while the peripheral flange area 24 of the top plate 20 is aligned with, or substantially aligned with and overlies the peripheral flange area 34 of the base tray 18 such that the top plate 20 encloses the plurality of fluid channels 32 defined within the cooling medium flow path area 30 of the base tray 18, the contact between the top plate 20 and the base tray 18 effecting the sealing relationship between the base tray 18 and top plate 20, and any intervening sealing member 25, to ensure the top plate 20 and base tray 18 are disposed in a fluid-tight relationship.

In some embodiments, for example, the peripheral flange area 34 of the base tray 18 may be larger than the peripheral flange area 24 of the top plate 20 and extend beyond the perimeter of the top plate 20 such that the peripheral flange area 24 of the top plate 20 overlies only a portion of the peripheral flange area 34 of the base tray 18. In other embodiments, for example, the peripheral flange area 34 of the base tray 18 may be the same size as the peripheral flange 24 of the top plate 20.

In some embodiments, for example, the cooling medium flow path area 30 is defined by a generally flat or planar base wall or bottom wall 36 that extends parallel to, or substantially parallel to, but spaced apart from the peripheral flange area 34 of the base tray 18, the plane of the bottom wall 36 being disposed below the plane of the peripheral flange area 34. An edge wall 38 extends generally upwardly from the bottom wall 36 which serves as a boundary defining the perimeter of the cooling medium flow path area 30, wherein the edge wall 38 includes a pair of opposite end walls 39, 41 that are inter-connected by a pair of opposite side walls 43.

In some embodiments, for example, fluid channels 32 are defined within the area bounded by edge wall 38 by a series of spaced apart ribs 40 that project out or extend out of the plane of the bottom wall 36 of the cooling medium flow path area 30. The ribs 40 extend only partially along the length of the cooling medium flow path area 30 and therefore have a length that is generally less than the length of sidewalls 43 of the cooling medium flow path area 30. Ribs 40, therefore, each have first and second ends 47, 49 that are spaced apart from the corresponding respective end wall 39, 41 of the edge wall 38 of the cooling medium flow path area 30, each fluid channel 32 therefore having an inlet end 33 and an outlet end 35. While the fluid channels 32 have been described as being defined between spaced apart ribs 40 that project or extend out of the plane of the bottom wall 36 of the cooling medium flow path area 30, it will be understood that, similarly, the fluid channels 32 may be defined by spaced apart grooves or channels formed within the material forming the base tray 18, the spaced apart grooves or channels being spaced apart and separated from one another by ribs 40.

An inlet manifold area 42 interconnects the inlet, ends 33 of the fluid channels 32 for distributing an incoming cooling medium or heat exchange fluid to the inlet ends 33 of the fluid channels 32. Similarly, an outlet manifold area 44 interconnects the outlet ends 35 of fluid channels 32 for discharging the cooling medium or heat exchange fluid from the heat exchanger 10. Depending upon the particular desired flow path through the cold plate heat exchanger 10, in some embodiments, the inlet manifold area 42 and outlet manifold area 44 can be disposed at opposite ends of the cooling medium flow path area 30 between the corresponding end wall 39, 41 and corresponding first or second ends 47, 49 of the ribs thereby forming a single pass heat exchanger. In embodiments, for example, such as the embodiment illustrated in FIGS. 2-6, the inlet manifold area 42 and outlet manifold area 44 are arranged adjacent to each other at one end of the heat exchanger 10 and separated from one another by a flow divider rib 46 that extends from one of the end walls 39 of edge wall 38 and terminates at a flow divider rib free end 48 that is spaced apart from the opposite end wall 41 of the edge wall 38. Flow divider rib 46 effectively divides the plurality of fluid channels 32 into a first group of incoming fluid channels 32(1) and a second group of outgoing fluid channels 32(2). A transitional manifold area 45 is disposed between the free end 48 of the flow divider 46 and the corresponding end edge 40 of the edge wall 38 of the cooling area 30 and fluidly interconnects the outlet ends 35 of the fluid channels 32 in fluid communication with the inlet manifold area 42 or the first group of fluid channels 32(1) (e.g. inlet fluid channels) and the inlet ends 33 of the fluid channels 32 in fluid communication with the outlet manifold area 44 or second group of fluid channels 32(2) (e.g. outlet fluid channels). In some embodiments, for example, more than one flow divider rib 46 may be provided within the cooling medium flow path area 30 with each subsequent flow divider rib 46 extending from the end wall 39, 41 that is opposite to the end wall 39, 41 from which the previous flow divider rib 46 extends such that the flow divider rib free end 48 of each subsequent flow divider rib 46 is spaced apart from the opposite end wall 39, 41 as the previous flow divider rib 46 such that a multi-pass flow path is provided within the cooling medium flow path area 30 with multiple transitional manifold areas 45 being provided between the inlet manifold area 42 and outlet manifold area 44 as shown, for instance, in FIG. 6B. However, it will be understood that whether the inlet and outlet manifold areas 42, 44 are arranged so as to provide a single-pass heat exchanger or a two or multi-pass heat exchanger will depend on the particular size of the heat exchanger 10 and/or the intended application for the heat exchanger 10. For ease of illustration, a two-pass heat exchanger 10 is described and shown in FIGS. 2-10 although it will be understood that other configurations are contemplated within the scope of the present disclosure.

In some embodiments, for example, the second side 19 of the base tray 18 serves as a support structure or support base for the heat exchanger to facilitate the installation and/or mounting of the heat exchanger 10 with battery units or battery packs or other components mounted on top thereof. In some embodiments, for example, the second side 19 of the base tray 18 provides a solid base with a continuous, or generally continuous, bottom support surface 31. In some embodiments, for example, the second side 19 of the base tray 18 includes a plurality of support surfaces 31 that are separated or spaced apart from each other by cavity regions formed within the base tray 18.

In some embodiments, for example, in order to secure the top plate 20 to the base tray 18, the heat exchanger 10 includes connecting structures 27 for providing a rigid, or substantially rigid, connection between the base tray 18 and the top plate 20. In some embodiments, for example, the connecting structures 27 include a plurality of first connecting elements 51 associated with the base tray 18 and a plurality of second connecting elements 53 associated with the top plate 20, the first and second connecting elements 51, 53 being cooperatively configured to align and position the top plate 20 relative to the base tray 18 and to secure the top plate 20 to base tray 18 in order to effect the fluid tight, sealing relationship therebetween. In some embodiments, for example, the connecting structures 27 further comprise a plurality of third connecting elements 55, which together with the first and second connecting elements 51, 53, are cooperatively configured to secure the top plate 20 to base tray 18 and effect the fluid tight, sealing relationship therebetween. At least one of the first, second or third connecting elements 51, 53, 55 comprise a projecting portion while one of the remaining connecting elements comprise a receiving portion wherein the projecting portion is received within the receiving portion for securing the top plate 20 to base tray 18.

Referring now, in particular to FIGS. 2-6, the connecting structures 27 include first connecting elements 51 disposed in base tray 18 comprise projecting portions or engaging members 50 that project out of the plane of the peripheral flange area 34 of the base tray 18 generally perpendicular to or normal to the plane of the peripheral flange area 34 of the base tray 18. In the subject example embodiment, the engaging members 50 are disposed about the peripheral flange area 34 of the base tray 18 at spaced apart intervals. In some embodiments, for example, the base tray 18 and the engaging members 50 are of unitary one-piece construction. The second connecting elements 53 disposed in top plate 20 comprise a plurality of openings 26 disposed about the peripheral flange area 24 of the top plate at spaced apart intervals that general correspond to the spaced apart intervals at which the engaging members 50 are disposed about the peripheral flange area 34 of the base tray 18, the plurality of openings 26 being configured for receiving the engaging members 50. In the example embodiment illustrated in FIG. 3, the plurality of openings 26 are in the form of elongated slots that are disposed about the peripheral flange area 24 of the top plate 20 at spaced apart intervals that correspond to the locations of the engaging members 50. When the top plate 20 is positioned on top of the base tray 18, the engaging members 50 are inserted through the corresponding openings 26 formed in the peripheral flange area 24 of top plate 20. The engaging members 50 therefore help to locate and/or properly position the top plate 20 with respect to the base tray 18. Once the top plate 20 is disposed over the engaging members 50 and disposed downwardly such that it is positioned on top of the base tray 18, the projecting portions or engaging members 50 are crimped or otherwise folded over the peripheral flange area 24 of the top plate 20 away from the battery-contacting area 22 so as to leave the battery-contacting area 22 free of surface interruptions that might interfere with the contact with the battery cells or battery cell containers 12 that are stacked on top of the top plate 20. The crimping of the engaging members 50 over the peripheral flange area 24 of the top plate 20 secures the top plate 20 in position and compresses the top plate 20 against the base tray 18 (and any intervening sealing member) thereby effecting the fluid tight, or substantially fluid tight, seal therebetween enclosing the fluid channels 32 between the top plate 20 and base tray 18. Accordingly, in some embodiments, for example, the first connecting elements and the second connecting elements are cooperatively configured such that while the fluid tight, or substantially fluid tight seal is effected, between the top plate and the base tray, the engaging members are disposed such that they exert a compressive force on the top plate relative to the base tray.

In some embodiments, for example, the first and second connection elements are cooperatively configured such that the projecting portions of the first connecting elements extend generally perpendicular to or normal to the peripheral flange area of the base tray, and a second position wherein the projecting portions extend generally parallel to the peripheral flange area of the base tray, wherein disposition of the projecting portion in the second position exerts the compressive force.

Inlet and outlet fittings (not shown) are disposed in fluid communication with the inlet and outlet openings 28, 29 formed in the top plate 20 for inletting and discharging an appropriate heat exchange fluid or coolant through the heat exchanger 10.

Figure 6:
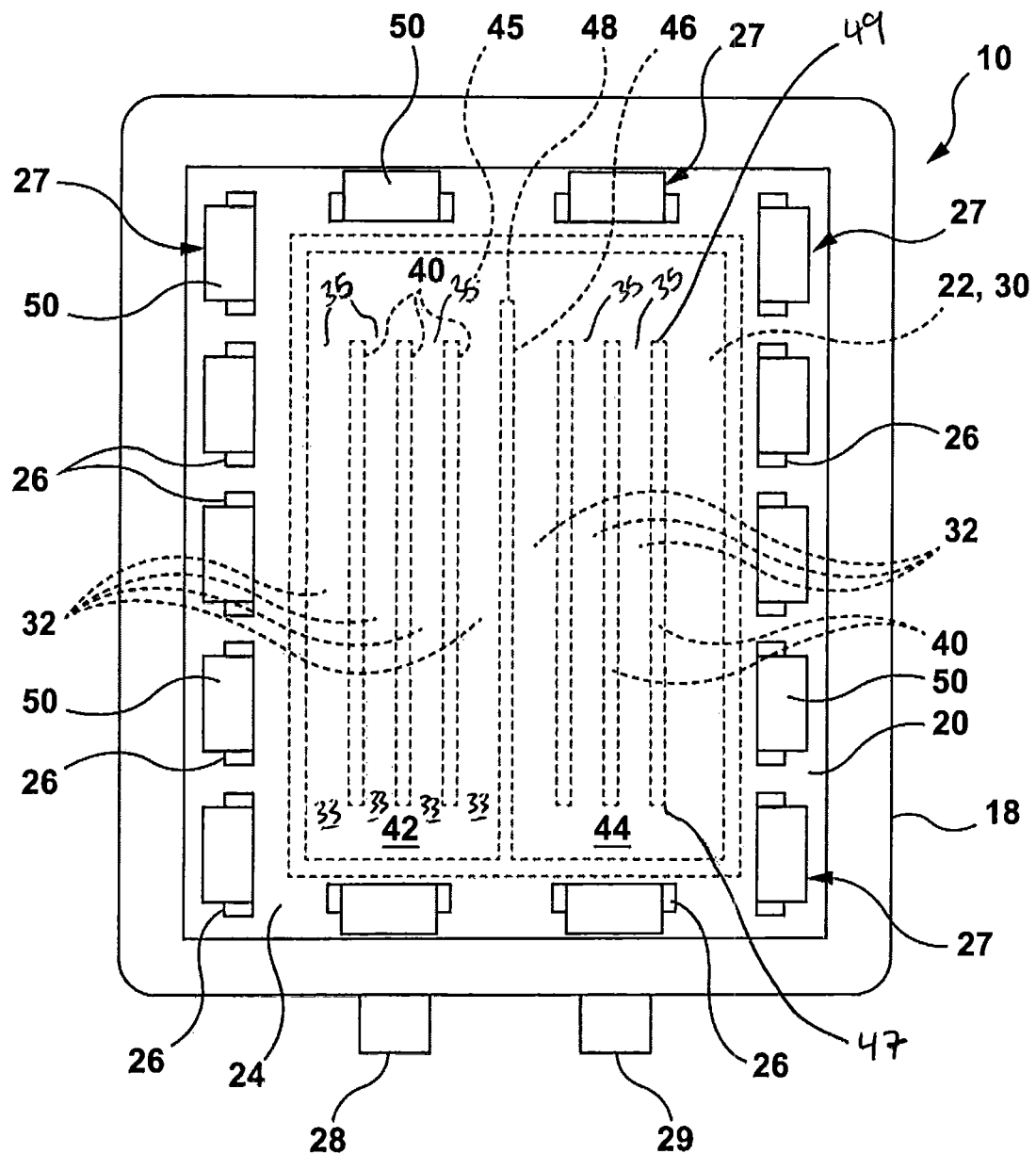
FIG. 6 is a top plan view of an alternate embodiment of the heat exchanger of FIG. 2.
Figure 6A:
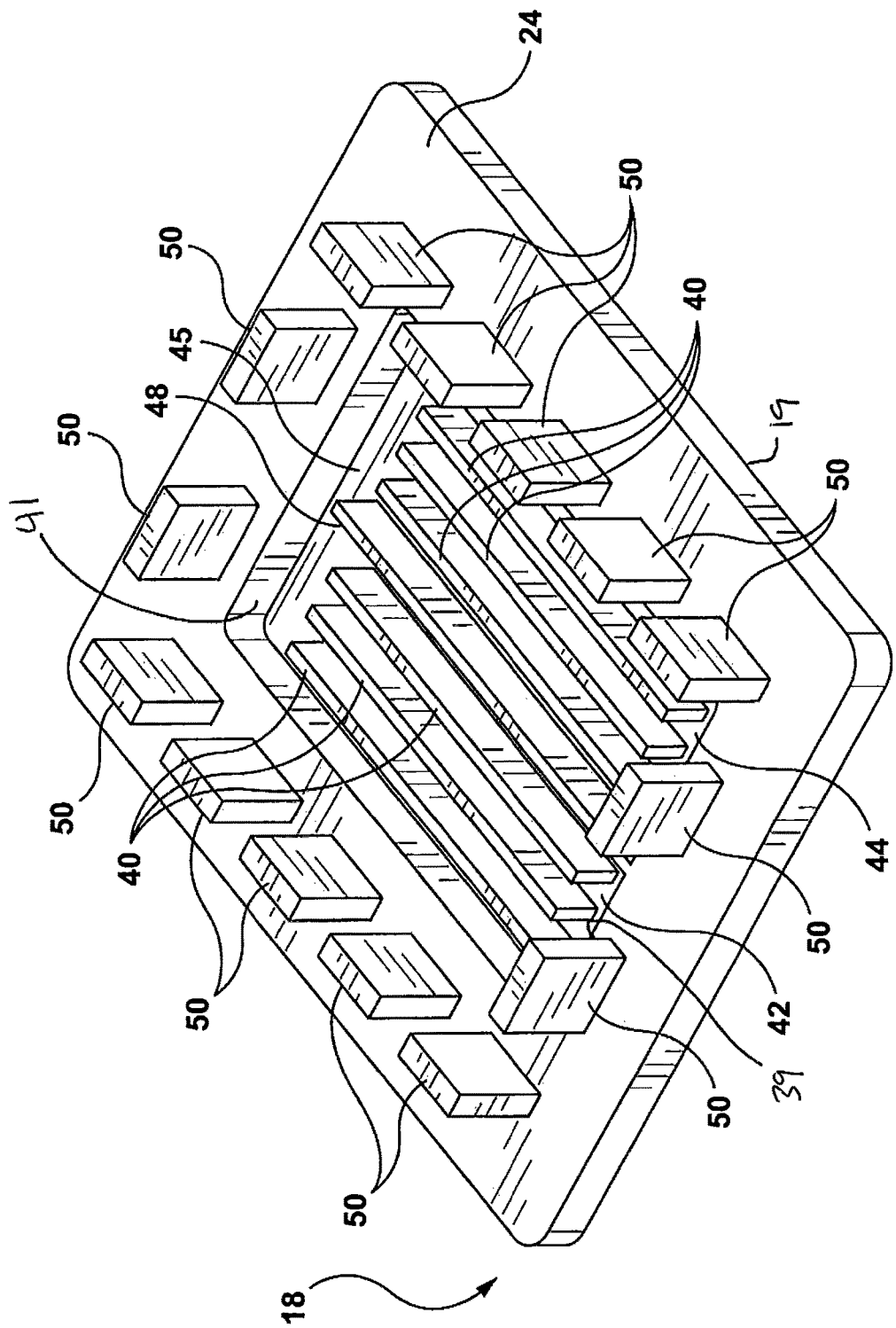
FIG. 6A is a top, perspective view of the base tray of the heat exchanger of FIG. 2.
Figure 6B:
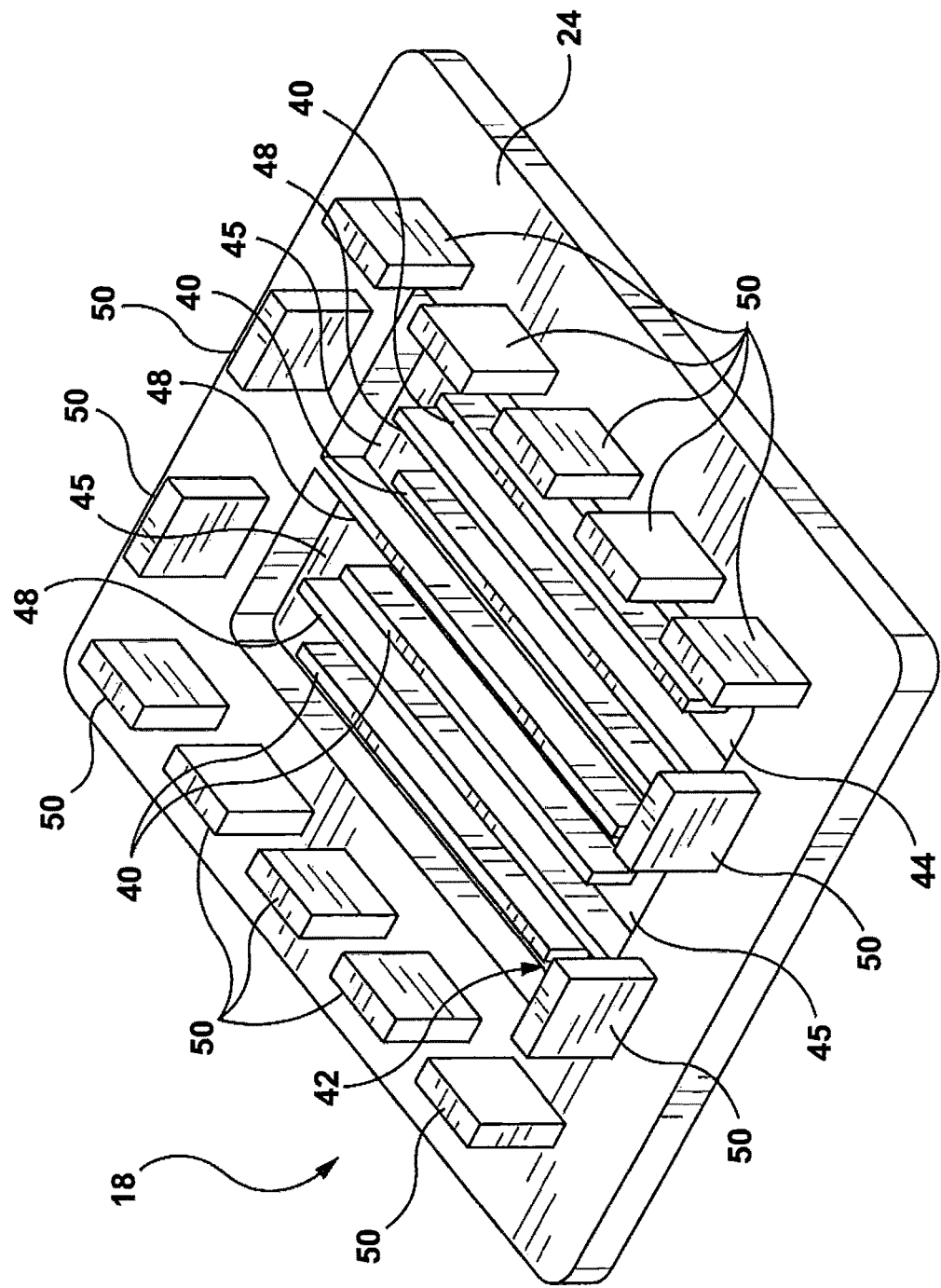
FIG. 6B is a top, perspective view of a variation of the base try of FIG. 6A.
Figure 7:
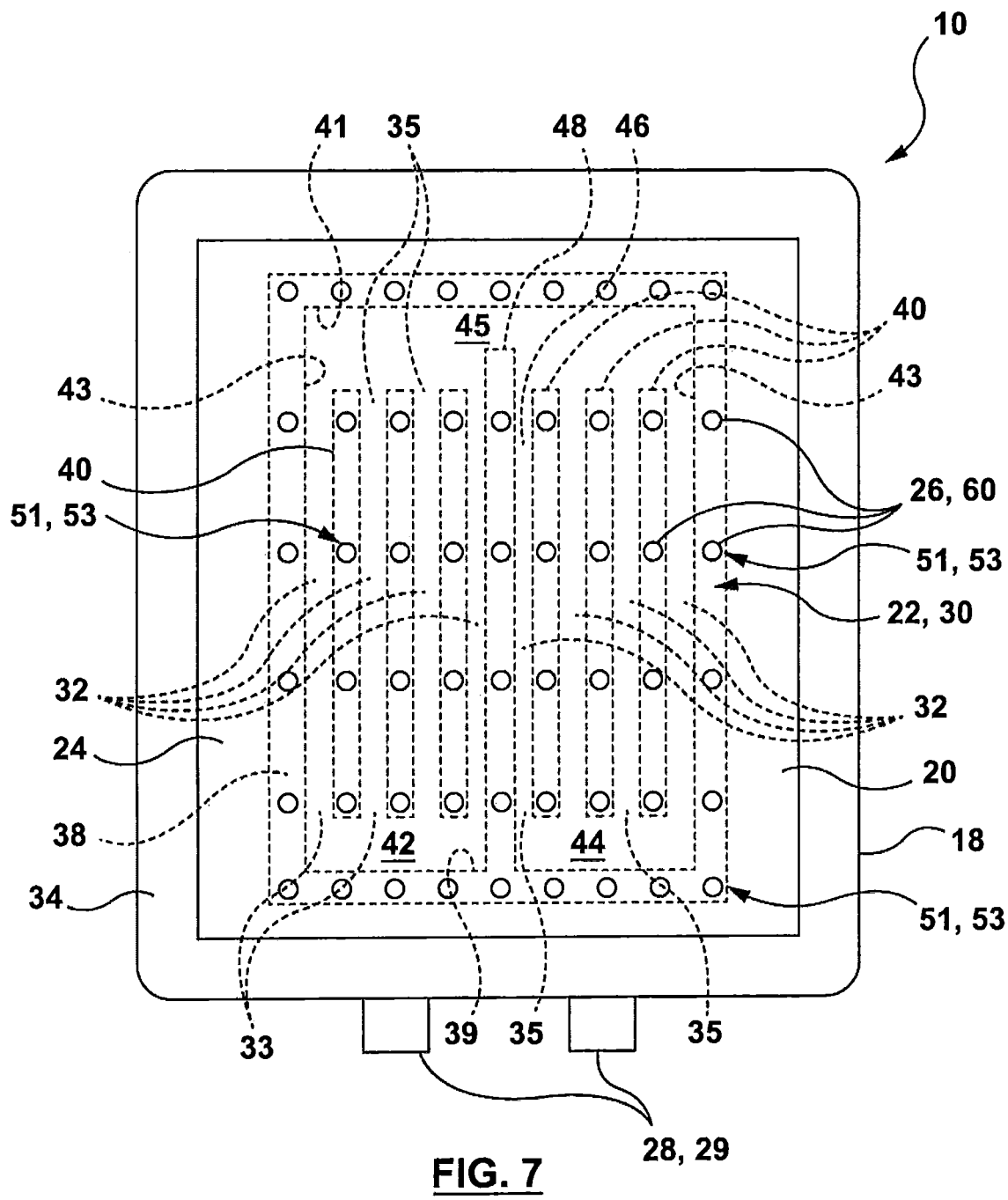
FIG. 7 is a top plan view of a heat exchanger according to another example embodiment of the present disclosure.
Figure 8:
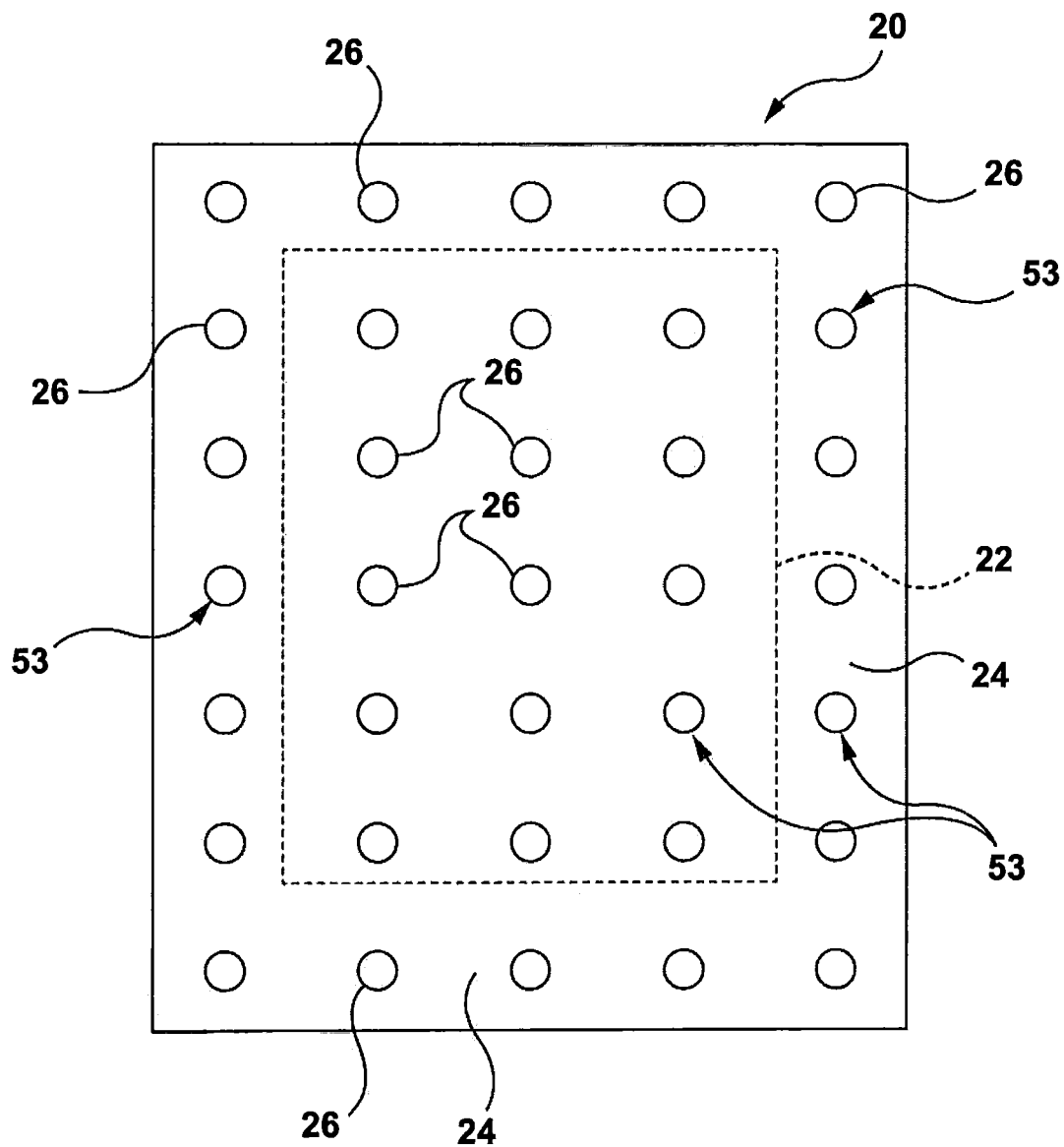
FIG. 8 is a top plan view of a top sheet for the heat exchanger of FIG. 7.
Figure 9:
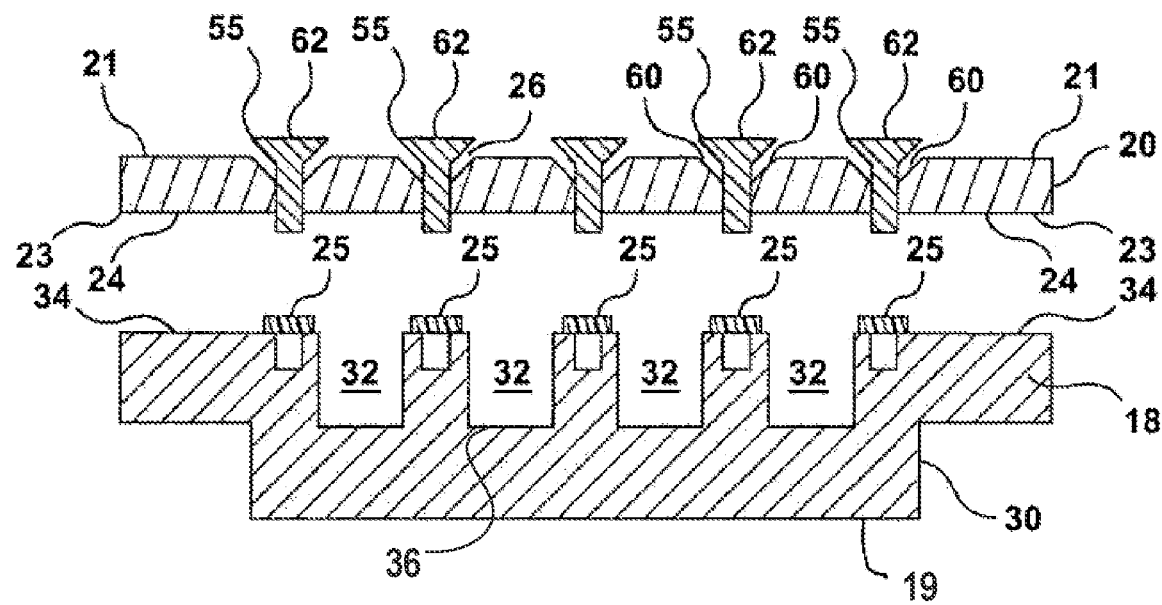
FIG. 9 is a schematic, exploded cross-sectional view through a heat exchanger of the type shown in FIG. 7 prior to assembly.
Figure 10:
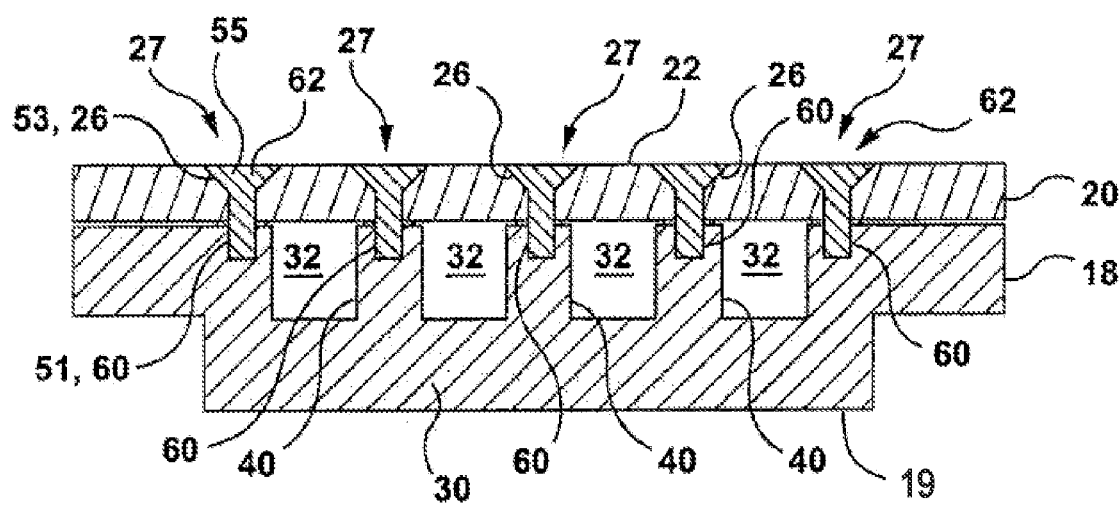
FIG. 10 is a schematic, cross-sectional view through a heat exchanger of the type shown in FIG. 7 after assembly.

Depending upon the desired locations for the inlet and outlet fittings, inlet and outlet openings 28, 29 may also be formed within the base tray 18 as shown, for instance in FIG. 6. In this example embodiment, the inlet and outlet openings 28, 29 extend through end edge 39 of the cooling area 30 of the base tray 18 with the inlet opening 28 being in fluid communication with the inlet manifold area 42 and with the outlet opening 29 being in fluid communication with the outlet manifold area 44.

Whether the inlet and outlet fittings are disposed on the top plate 20 or extend through the base tray 18 into the cooling area 30, in use, a heat exchange fluid, for instance any suitable cooling fluid or coolant, enters the heat exchanger 10 through inlet opening 28 and is distributed via the inlet manifold area 42 to the plurality of fluid channels 32 disposed in fluid communication with the inlet manifold area 42. In the example embodiment of FIGS. 2-6, the heat exchanger 10 is a two-pass heat exchanger so the fluid entering the fluid channels 32 disposed in fluid communication with the inlet manifold area 42 travels along the fluid channels 32 to the transitional manifold area 45 where it is directed about the free end 48 of the flow divider 46 to the fluid channels 32 disposed in fluid communication with the outlet manifold area 44. The fluid travels along this set of fluid channels 32 where it is discharged from the heat exchanger 10 through outlet opening 29 via the outlet manifold area 44.

As the fluid travels through the plurality of fluid channels 32 in heat exchanger 10, heat is drawn away from the battery cells (or battery cell containers) 12 (or other electronic components) via heat transfer from the battery cells 12 to the fluid circulating within the heat exchanger 10 via the primary heat transfer surface 16 provided by top plate 20.

Referring now to FIGS. 7-10, there is shown another example embodiment of a heat exchanger 10 according to the present disclosure. In the subject embodiment, rather than having the top plate 20 and base plate 18 attached together by way of crimping of the integrally formed engaging members 50 that project out of the peripheral flange area 34 of the base tray 18 over the top plate 20 through openings 26, the heat exchanger 10 comprises connecting structures 27 that include first, second and third connecting elements 51, 53, 55. The first connecting elements 51 in base tray 18 comprise a plurality of openings 60 in the form of bolt holes or bolt openings that are disposed about the peripheral flange area 34 at spaced apart intervals. Openings 60 are also provided along each of the ribs 40 forming fluid channels 32 through the cooling area 30 as well as along flow divider 46. Accordingly, first connecting elements 51 or openings 60 are provided in each of the sealing surfaces that make up the interface between the base tray 18 and the top plate 20. In the subject example embodiment, it will be understood that the peripheral flange area 34 and the individual ribs 40 and flow divider rib 48 are of sufficient width and height to accommodate openings extending therein that are configured for receiving a corresponding fastener or connector.

The second connecting elements 53 in top plate 20 also comprise a plurality of openings 26 that are disposed about the peripheral flange area 24 so as to correspond to the location of the openings 60 disposed in the base tray 18. Second connecting elements 53 are also disposed longitudinally through the battery-contacting area 22 in-line with, or substantially in-line, with the ribs 40 that form fluid channels 32. Therefore, when the top plate 20 is positioned on top of base tray 18 the openings 26 in the top plate 20 are aligned, or substantially aligned, with the corresponding openings 60 formed in base tray 18, the openings 26 in the top plate 20 therefore being in register with the openings 60 in the base tray 18.

In the subject example embodiment, third connecting elements 55 comprising a projecting portion are inserted through the corresponding openings 26, 60 in the top plate 20 and base tray 18 which serve as receiving portions. The openings 60 formed in base tray 18 may, therefore, be threaded openings for engaging with corresponding threads formed on the corresponding projecting portion of the third connecting elements or fastening devices 55 which may include bolts or any other suitable fastener that can be used to secure and/or attach the top plate 20 in position on the base tray 18 and provide sufficient compressive forces to effect the sealing relationship between the top plate 20 and the base tray 18.

Figure 11A:
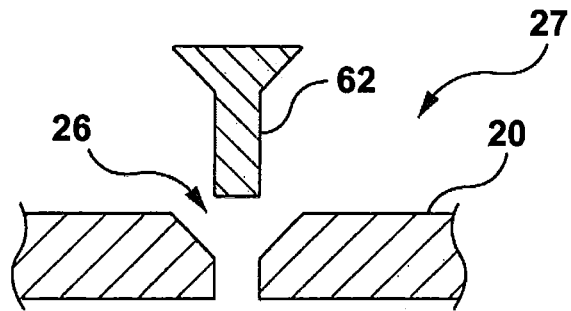
FIGS. 11A-11C are detail views of the assembly of the heat exchanger of FIGS. 4 and 5.
Figure 11B:
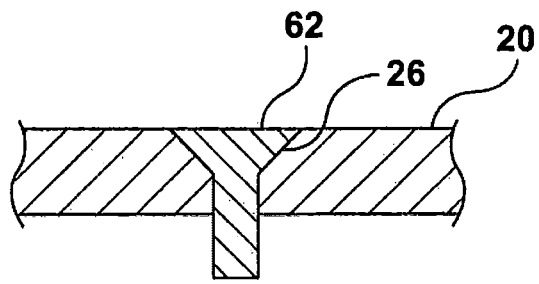
Figure 11C:
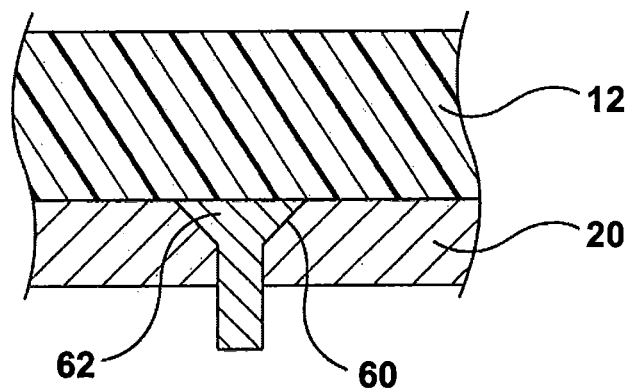

In order to minimize any interference between the third connecting elements or bolts or fasteners 62 and the battery cells or battery cell containers 12 (or other electronic components) disposed on top of the heat exchanger 10, the openings 60 in base tray 18 are recessed or counter-sunk in order to ensure that the heads 64 of the bolts or fasteners are flush with the surface of the top plate 20, as shown for instance in FIGS. 11a-11c.

Figure 12:
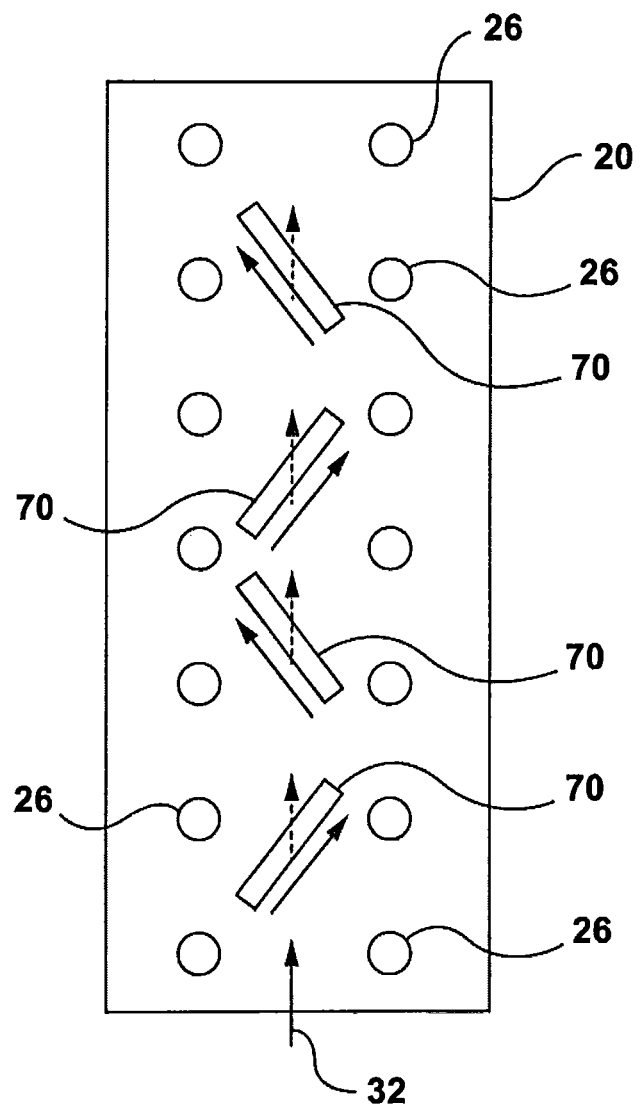
FIG. 12 is a top plan view of a portion of an alternate embodiment of a top plate as shown in FIG. 8.
Figure 13:
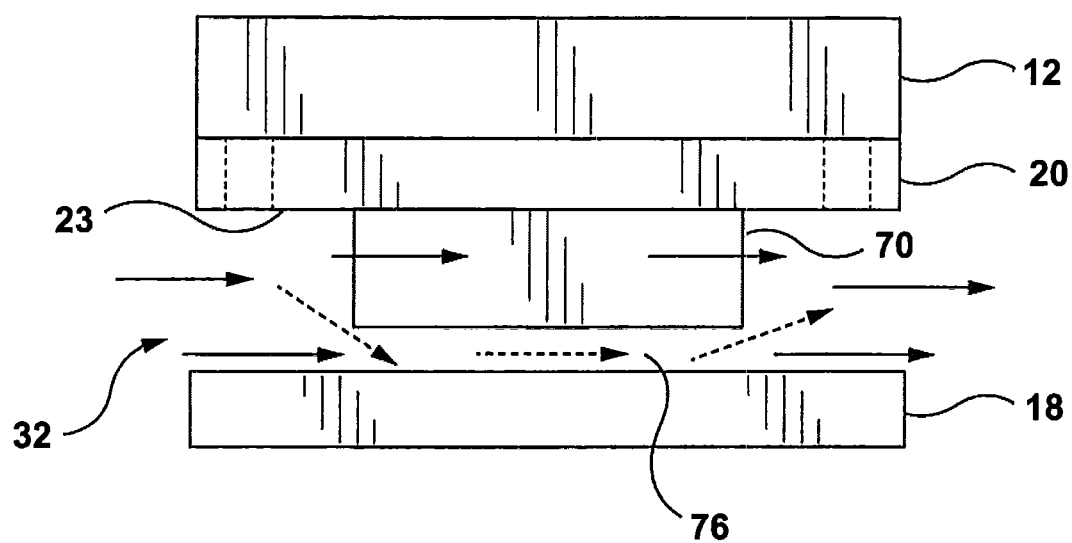
FIG. 13 is a schematic, longitudinal cross-sectional view through a rechargeable battery unit with heat exchanger incorporating the top plate of FIG. 11 illustrating a flow path through one of the fluid channels of the heat exchanger.
Figure 14:
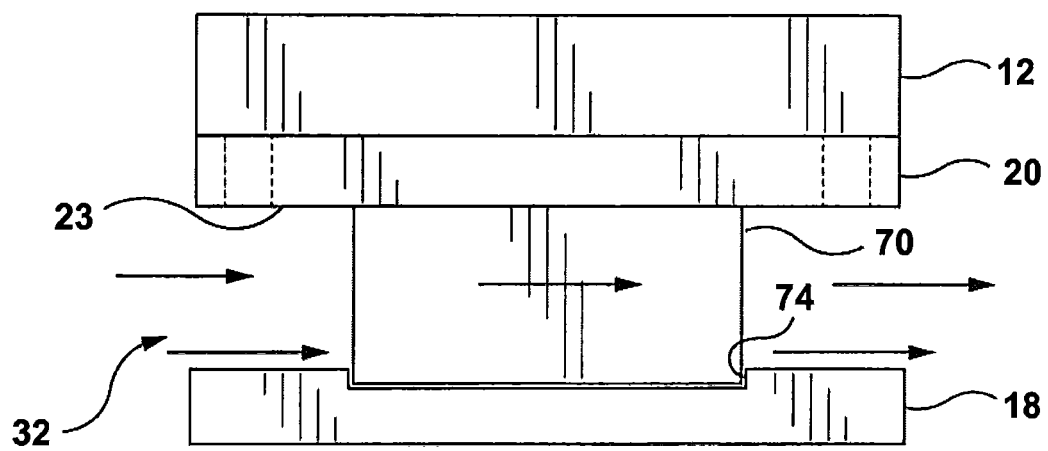
FIG. 14 is a schematic, longitudinal cross-sectional view through a rechargeable battery unit with an alternate embodiment of a heat exchanger incorporating the top plate of FIG. 11 illustrating a flow path through one of the fluid channels of the heat exchanger.

Referring now to FIGS. 12-14, in order to enhance heat transfer performance of the heat exchanger 10 and in an effort to reduce surface temperatures on top plate 20, fluid channels 32 may be provided with heat transfer enhancement features 70 which serve to direct the fluid flow through the fluid channels 32 to create a desired flow pattern through the individual channels 32 as well as to disrupt boundary layer formation and increase turbulence within the fluid. In some embodiments, the heat transfer enhancement features 70 may be in the form of a turbulizer or and offset strip fin disposed in each of the fluid channels 32. In other embodiments, the top plate 20 may comprise ribs or other shaped surface protrusions that project from the second side 23 of the top plate 20 in the areas that face or enclose the fluid channels 32 when the top plate 20 is disposed on base tray 18. FIG. 12 illustrates heat transfer enhancement features 70 in the form of diagonally oriented ribs that are arranged at spaced apart intervals along the length of the fluid channels 32 in an alternating, oppositely disposed pattern. Accordingly, fluid that enters fluid channels 32 in the longitudinal direction impinges on or against the first heat transfer enhancement feature 70 and is directed diagonally where it will impinge against the rib 40 forming fluid channel and will be redirected back towards the other side of the fluid channel 32. This alternating or switch-back pattern will continue along the length of the fluid channel 32 creating the desired turbulence.

In some embodiments, the ribs 70 that project from the second side 23 of the top plate 20 project into the fluid channel 32 but do not necessarily extend the full height of the fluid channel 32 or come into contact with the bottom surface of the fluid channel 32. When the ribs or heat transfer enhancement features 70 do not extend the full height of the fluid channel 32 or come into contact with the bottom surface of the fluid channel 32 some fluid entering the fluid channel 32 will pass underneath the heat transfer enhancement 70 and effectively bypass the heat transfer enhancement feature 70 and primary heat transfer surface 22 through bypass channels 76 as shown by the schematic directional flow arrows included in FIG. 13.

In order to minimize the amount of fluid bypassing the heat transfer enhancement features 70 and the primary heat transfer surface 22, the battery tray 18 may include grooves or recessed areas 74 disposed along the fluid channels 32 that correspond to the heat transfer enhancement features 70, the heat transfer enhancement features 70 nesting or being received within the grooves 74. Accordingly, the heat transfer enhancements 70 and the grooves 74 are cooperatively configured so as to effectively prevent, or substantially prevent, bypass flow between the heat transfer enhancement features 70 and the bottom surface of the fluid channels 32 as shown in FIG. 14.

Figure 15:
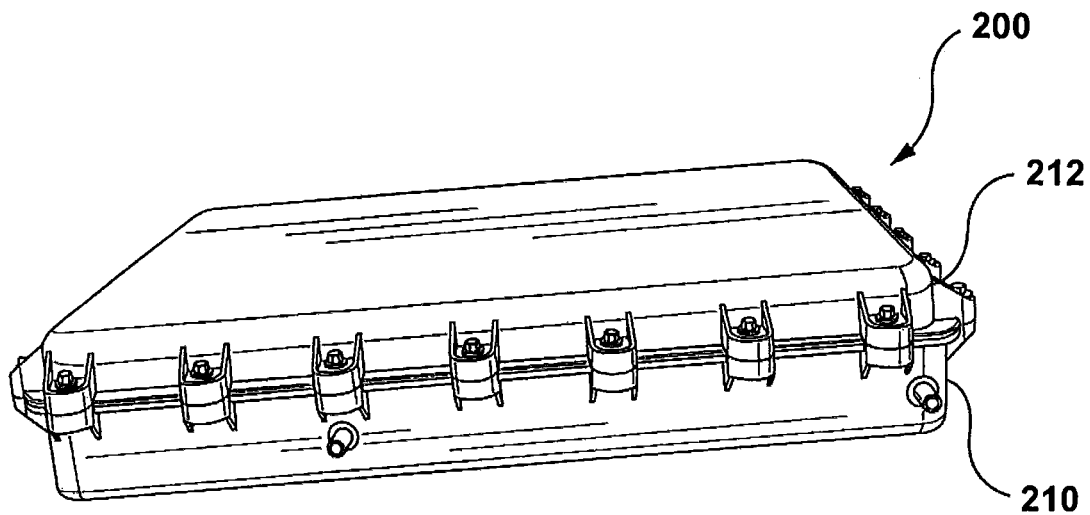
FIG. 15 is a perspective view of an example embodiment of an enclosure housing a heat exchanger according to the present disclosure.
Figure 16:
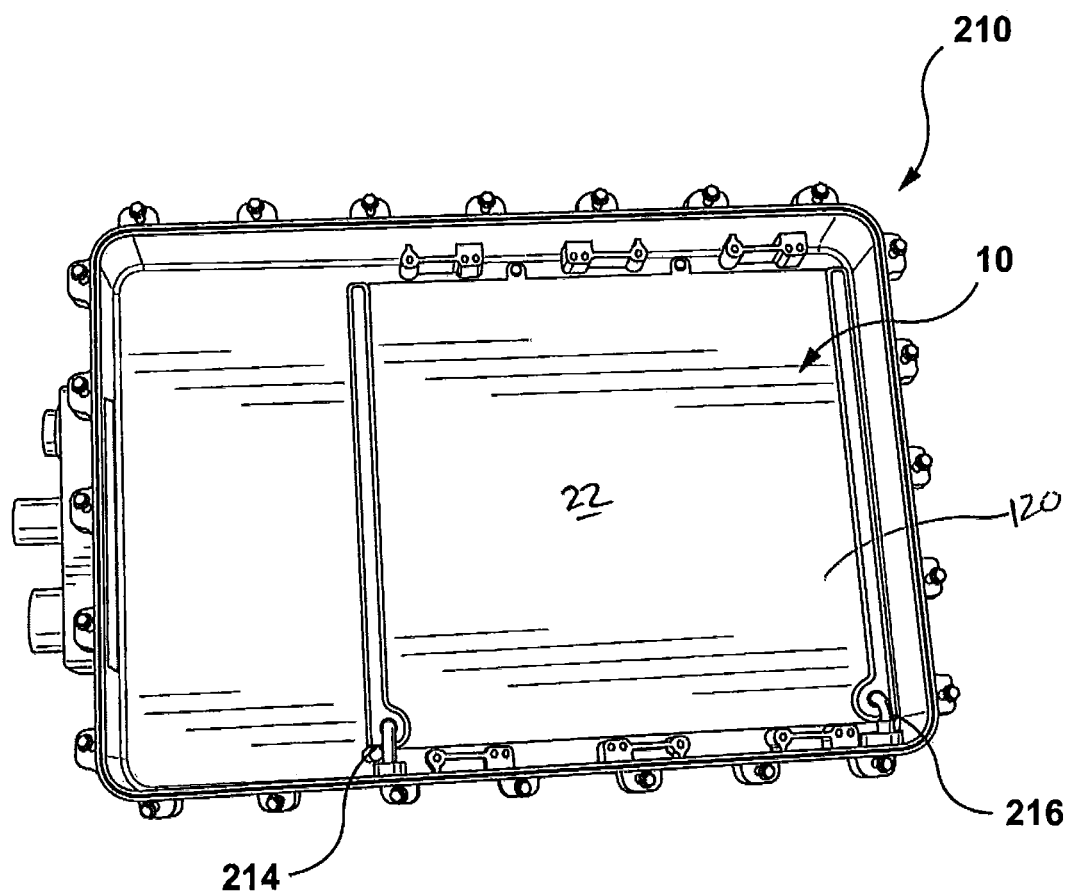
FIG. 16 is a top, perspective view of the enclosure of FIG. 15 with the cover portion removed.

In some embodiments, for example, the heat exchanger 10 is mounted or installed within an enclosure 200 suitable for housing battery units or battery packs (or other electronic components) that are stacked on top of the heat exchanger 10. A heat exchanger 10 mounted within an enclosure is shown, for instance, in FIGS. 15-16. In the subject example embodiments, the enclosure 200 includes a bottom portion 210 and a cover portion 212 that are joined or otherwise sealed together at a common interface surface, for instance, using bolts or any other suitable fasteners. Corresponding fluid inlet and fluid outlet lines or fittings 214, 216 extend through a wall of the bottom portion 210 for establishing fluid communication with the heat exchanger 10 disposed within the bottom portion 210.

Figure 17:
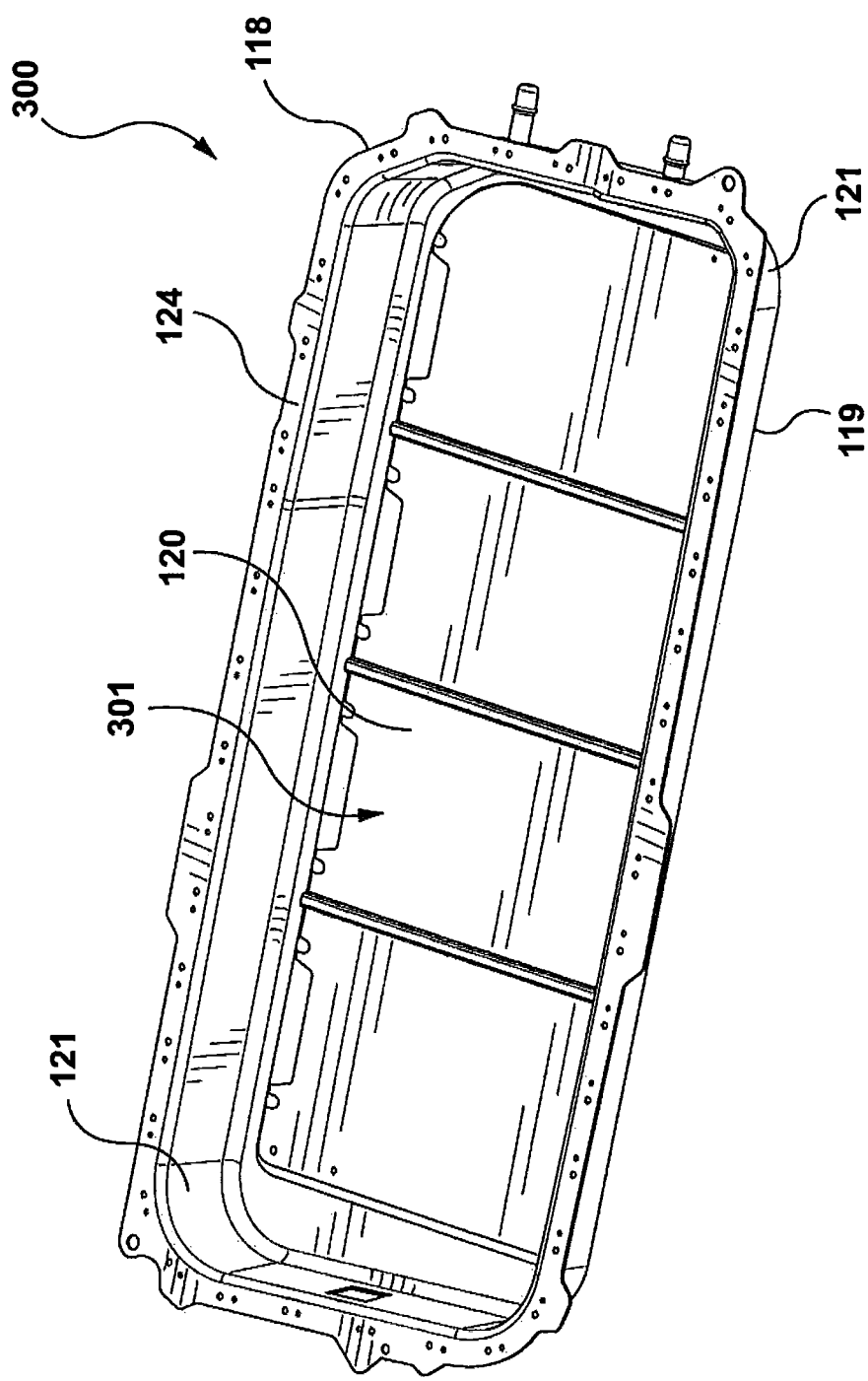
FIG. 17 is a top, perspective view of a heat exchanger according to another embodiment of the present disclosure.
Figure 18:
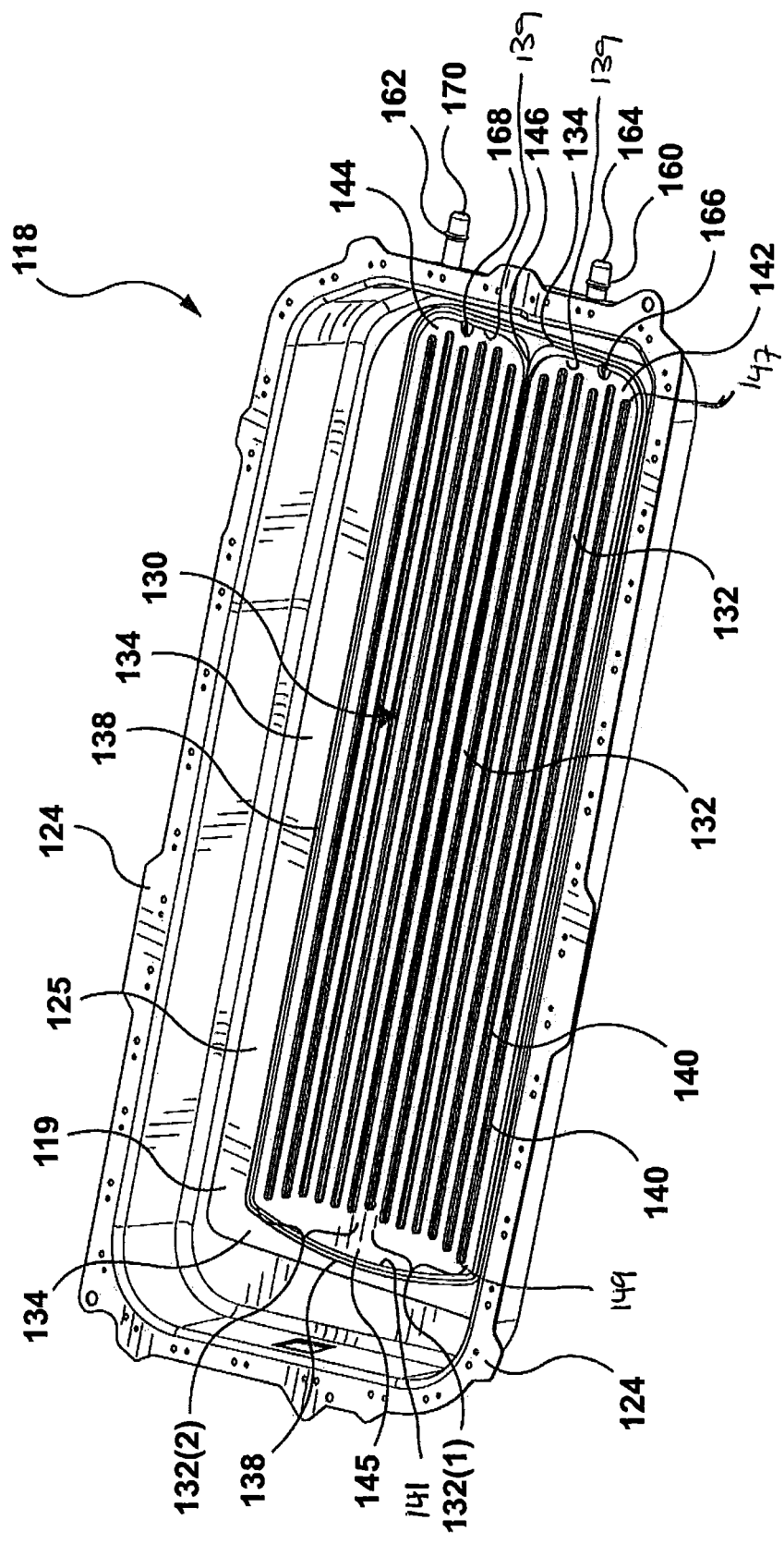
FIG. 18 is a top, perspective view of the base tray of the heat exchanger of FIG. 17.
Figure 19:
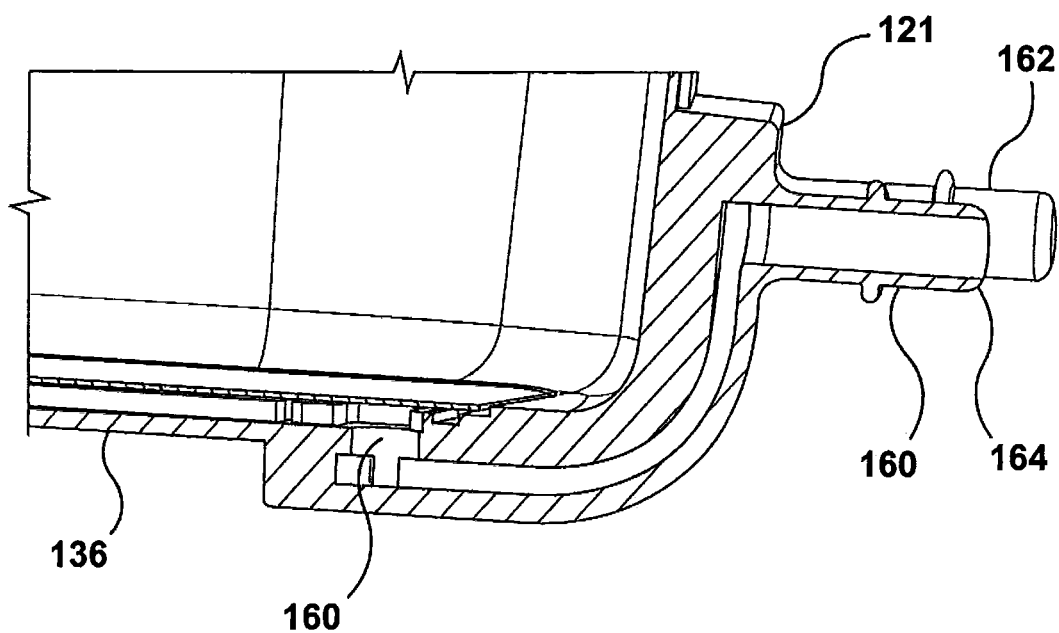
FIG. 19 is a detail, cross-sectional view through one of the fluid fittings of the heat exchanger of FIG. 17.

Referring now to FIGS. 17-19, there is shown another example embodiment of a heat exchanger 100 according to an example embodiment of the present disclosure. Where appropriate, similar reference numerals or reference numerals increased by a factor of 100 have been used to identify similar features. In the subject example embodiment, the enclosure 300 is modified such that the heat exchanger 100 is formed as part of the enclosure 300 for housing battery packs (or battery cells) or other electronic components (not shown), the enclosure 300 being mounted within the vehicle when used for automobile applications. In the subject example embodiment, the enclosure 300 includes a base tray 118 and a cover portion 119 that together define an open interior space 301 for housing the battery packs or cells 12 (or other heat-generating components) as will be described in further detail below.

In the subject example embodiment, the base tray 118 includes a bottom wall 119 surrounded on all sides by a sidewall 121. In the subject example embodiment, the sidewall 121 has a height that is significantly greater than the height or depth of the fluid channels 132 of the heat exchanger 100, the sidewall 121 defining a portion of the sidewall or edge wall of the enclosure 300. A peripheral flange 124 extends away from the upper edge of the sidewall 121, the peripheral flange 124 defining a sealing surface 123 extending in a plane generally parallel to, or substantially parallel to, the plane of the bottom wall 119 of the base tray 118, the sidewall 121 extending continuously between and interconnecting the bottom wall 119 and peripheral flange 124.

The inner surface 125 of the bottom wall 119 includes a heat exchanger area or cooling medium flow path area 130. In some embodiments, for example, the cooling medium flow path area 130 extends across a large portion of or the entire area defined by the bottom wall 119 such that the bottom wall 119 of the base tray 118 serves as the bottom plate or base tray of the heat exchanger 100, for instance as shown in FIG. 18. In some embodiments, the cooling medium flow path area 130 covers or extends over only a portion of the area defined by the bottom wall 119 of the base tray 118.

Whether the heat exchanger area or cooling medium flow path area 130 extends across a large portion of or the entire area defined by the bottom wall 119 or only a portion of the area defined by the bottom wall 119, the cooling medium flow path area 130 is surrounded on all sides by a peripheral flange area 134 that extends beyond or away from the cooling medium flow path area 130. The peripheral flange area 134, therefore, is configured for sealing engagement with the underside of the top plate 120, when the top plate 120 is disposed within the base tray 118 of the enclosure 300 for enclosing the cooling medium flow path area 130.

The cooling medium flow path area 130 includes a bottom wall 136 with an edge wall 138 extending around all sides thereof, the cooling medium flow path area 130 therefore being defined within the area bounded by the edge wall 138. A plurality of fluid channels 132 are defined within the area bounded by the edge wall 138 by a series of spaced apart ribs 140 that project out of extend out of the plane of the bottom wall 136 of the cooling medium flow path area 130. The ribs 140 each have a length that is less than the overall length defined by the cooling medium flow path area 130. Ribs 140, therefore, extend between respective first and second ends 147, 149, the first and send ends 147, 149 each being spaced apart from the corresponding respective end wall 139, 141 of the edge wall 138 of the cooling medium flow path area 130. The fluid channels 132, therefore each have an inlet end 133 and an outlet end 135.

An inlet manifold area 142 interconnects the inlet ends 133 of the fluid channels 132 defined within the cooling medium flow path area 130 for distributing an incoming cooling medium or heat exchange fluid to the inlet ends 133 of the fluid channels 132. Similarly, an outlet manifold area 144 interconnects the outlet ends 35 of fluid channels 132 for discharging the cooling medium or heat exchange fluid from the heat exchanger 100 defined within the base tray 118 of the enclosure 300. Depending upon the particular desired flow path through the heat exchanger 100, in some embodiments, the inlet manifold area 142 and outlet manifold area 144 can be disposed at opposite ends of the cooling medium flow path area 130 between the corresponding end wall 39, 41 of the edge wall 138 of the cooling medium flow path area 130 and corresponding first or second ends 147, 149 of the ribs thereby forming a single pass heat exchanger 100 within the enclosure 300. In some embodiments, for example, such as the example embodiment illustrated in FIGS. 17-19, the inlet manifold area 142 and outlet manifold area 144 are arranged adjacent to each other at one end of the heat exchanger 100, the inlet manifold area 142 and the outlet manifold area being separated from one another by a flow divider rib 146 that extends from one of the end walls 39 of edge wall 38 of the cooling medium flow path area 130 and terminates at a flow divider rib free end 148 that is spaced apart from the opposite end wall 141 of the edge wall 138. Flow divider rib 146 effectively divides the plurality of fluid channels 132 into a first group of incoming fluid channels 132(1) and a second group of outgoing fluid channels 132(2). A transitional manifold area 145 is disposed between the free end 148 of the flow divider rib 146 and the corresponding end edge 140 of the edge wall 138 of the cooling medium flow path area 130 and fluidly interconnects the outlet ends 135 of the fluid channels 132 in the first group of incoming or inlet fluid channels 132(1) and the inlet ends 133 of the fluid channels 132 in the second group of fluid channels 132(2) or outgoing or outlet fluid channels 132(2). In some embodiments, for example, more than one fluid divider rib 146 may be provided with each subsequent flow divider rib 146 extending from the end wall 139, 141 that is opposite to the end wall 139, 141 from which the previous flow divider rib 146 extends such that a multi-pass flow path is provided within the cooling medium flow path area 130 with multiple transitional manifold areas 145 being provided between the inlet manifold area 142 and outlet manifold area 144.

Referring in particular to FIGS. 18 and 19, in the subject example embodiment, the base tray 118 includes a fluid inlet passage 160 for inletting the cooling medium or heat exchanger fluid into the inlet manifold area 142 of the heat exchanger 100 defined within the enclosure 300 and an outlet passage 162 for discharging the cooling medium or heat exchanger fluid from the outlet manifold area 144 of the heat exchanger 100 defined within the enclosure 300. The fluid inlet passage 160 extends between an inlet end 164 configured for receiving a corresponding fluid fitting or fluid line, the fluid fitting or fluid line supplying the heat exchange fluid or cooling medium to the heat exchanger 100, and an outlet end 166 disposed within the inlet manifold area 142 of the cooling medium flow path area 130 for delivering fluid to the corresponding fluid channels 132. In some embodiments, the inlet end 164 is disposed at an end of a tube-like projection that extends away from the sidewall 121 of the base tray 120. In some embodiments, for example, the inlet end 164 may be disposed within a surface of the sidewall 121 and configured for receiving or mating with a corresponding fluid fitting.

The fluid outlet passage 162 extends between an inlet end 168 disposed in fluid communication with the outlet manifold area 144 of the cooling medium flow path area 130 and an outlet end 170 configured for receiving a corresponding fluid fitting or fluid line, the fluid fitting or fluid line serving to discharge the heat exchange fluid or cooling medium from the heat exchanger 100 disposed within the enclosure and return the fluid elsewhere in the overall fluid or cooling system. By having the fluid inlet passage 160 and fluid outlet passage 162 integrally formed within the base tray 118 of the enclosure 300, the heat exchanger 100 itself does not require fluid inlet and outlet fittings minimizing the overall number of fluid connections that would otherwise require brazing which connections may give rise to potential leakage.

In order to enclose the cooling medium flow path area 130, top plate 120 is disposed within the base tray 118 on top of the heat exchanger area of cooling medium flow path area 130 in face-to-face relationship with the bottom wall 136 of the base tray 118 so as to effect a sealing relationship therebetween. The top plate 120 has a first side 21 that defines the primary heat transfer area 22, that provides a planar, or substantially planar, surface upon which auxiliary components, for example battery units or other electronic components that require cooling may be arranged. The top plate 120 further comprises a second side 23, opposite to the first side 21, which is configured for sealing contact, or substantially sealing contact, with the base tray 118, the second side 23 of the top plate 120 being disposed in face-to-face relationship or sealing contact with the peripheral flange area 134 surrounding the cooling medium flow path area 130 and the upper surfaces of the ribs 140 and any flow divider ribs 46 formed within the cooling medium flow path area 130 in order to effect a fluid-tight seal therebetween. As described above, in some embodiments, for example, a sealing member, for example a sealing gasket, may be disposed between the base tray 118 and the second side 23 of the top plate 120 for effecting a fluid tight, or substantially fluid tight seal, therebetween.

The top plate 120 is secured in position within the base tray 118 of the enclosure by any suitable means, for effecting the sealing relationship between the second or underside 23 of the top plate 120 and the cooling medium flow path area 130 of the base tray 118. In some embodiments, for example, the top plate 120 is bolted to the base tray 118. In other embodiments, for example, the top plate 120 may be glued to the base tray 118.

The top plate 120 is comprised of a first, thermally conductive, material such as aluminum or an aluminum alloy, as described above, in order to effect heat transfer with the battery units or other components arranged on top of the top plate 12. In some embodiments, for example, the base tray 118 and cover portion 119 of the enclosure 300 are comprised of a second, non-thermally conductive material. In other embodiments, the base tray 118 and/or cover portion 119 may be comprised of cast aluminum, for example.

In use, once the top plate 120 has been secured in position within the base tray 118 enclosing the heat exchanger area or cooling medium flow path area 130 and the battery units or battery packs or other electronic components requiring cooling/warming are arranged within the base tray 118 on top of the top plate 120, cover portion 119 is disposed on top of the base tray 118 in mating relationship with the base tray 118. The cover portion 119 may have any suitable form for enclosing or housing the battery packs (or other components) disposed within the base tray 119. In some embodiments, for example, the cover portion 119 has a top wall 175 surrounded on all sides by a downwardly depending sidewall 177 with a peripheral flange 179 extending away from the edge of the sidewall 177 such that when the cover portion 119 of the enclosure 300 is disposed on top of the base tray 118, the peripheral flange 179 of the cover portion 119 overlies the peripheral flange 124 of the base tray 118 such that the two flanges 179, 124 are disposed in face-to-face sealing contact as shown for instance in Figure X. In some embodiments, for example, the cover portion 119 is bolted to the base tray 118. In some embodiments, for example, the cover portion 119 may be in the form of a flat plate that overlies the base tray 118 in sealing contact with the peripheral flange 124 of the base tray 118.

Accordingly, in some embodiments, for example, heat exchanger 100 comprises a base tray 118 having a bottom wall and a sidewall 121 extending generally perpendicular to the bottom wall and surrounding the bottom wall, wherein the base tray includes a cooling medium flow path area 130 comprising a plurality of fluid channels 132, wherein the plurality of fluid channels 132 extend between an inlet manifold area 142 and an outlet manifold area 144 for the flow of a heat exchange fluid through the heat exchanger 100 with a peripheral flange area 134 extending from and surrounding the cooling medium flow path area 130. The heat exchanger 100 includes a top plate 120 having a first side defining a primary heat transfer area for receiving one or more heat-generating components and a second side, opposite to the first side, for effecting a sealing relationship between the top plate and an inside surface of the base tray 118 for enclosing the plurality of fluid channels 132 defined within the cooling medium flow path area 130. A cover portion 119 is configured for disposition in sealing relationship with the base tray 118 such that the cover portion 119 and base tray 118 together define an open interior space for housing the heat-generating components disposed on the top plate 120, the cover portion 119 having a sealing surface disposed in face-to-face sealing relationship with the peripheral flange 124 of the base tray 118.

By providing a heat exchanger 100 directly within the base tray 118 of an enclosure 300 for housing battery units or battery packs (or other electronic components that require warming/cooling), the overall installation of the components and heat exchanger within the overall vehicle or automobile assembly is simplified. Furthermore, having the fluid inlet and fluid outlet passages integrally formed within the base tray 118 minimizes the overall number of fluid connections which may help to risk of potential leakage.

Accordingly, in some embodiments, for example, there is provided a battery enclosure 300 comprising base tray 118 having a bottom wall 136 and a sidewall 121 extending generally perpendicular to the bottom wall and surrounding the bottom wall 136. A cover portion 119 is configured for disposition in sealing relationship with the base tray 118 such that the cover portion 119 and base tray 118 together define an open interior space for housing one or more rechargeable battery units 12. The base tray 118 includes a cooling medium flow path area 130 defined within the bottom wall 136 of the base tray 118. A top plate having a first side defining a primary heat transfer area for receiving the one or more one or more rechargeable battery units and a second side, opposite to the first side, for effecting a sealing relationship between the top plate and an inside surface of the base tray for enclosing the cooling medium flow path area is disposed on top of and in alignment with the cooling medium flow path area 130. The battery enclosure 300 includes a fluid inlet passage 160 disposed within the base tray 118 for inletting a heat exchange fluid into the cooling medium flow path area 130 and a fluid outlet passage 162 disposed within the base tray 118 for discharging the heat exchange fluid from the cooling medium flow path area 130 and the battery enclosure 300.

While various example embodiments have been described, it will be understood that certain adaptations and modifications of the described embodiments can be made. Therefore, the above discussed embodiments are considered to be illustrative and not restrictive.

What is claimed is:

1. A heat exchanger assembly, comprising:
   an enclosure forming an open interior space receiving heat generating components, the enclosure comprising:
   sidewalls surrounding the open interior space;
   a cover portion positioned on a first end of the sidewalls; and
   a bottom portion positioned on a second end of the sidewalls opposite the first end, the bottom portion comprising:
   a bottom wall extending between the sidewalls,
   a base tray defining a plurality of fluid channels in a fluid space extending outward from the bottom wall, the plurality of fluid channels extending between an inlet manifold area and an outlet manifold area for the flow of a heat exchange fluid,
   engaging members forming a perimeter around the fluid space within the base tray,
   a top plate positioned over the base tray to seal the fluid space from the open interior space, the top plate forming part of the bottom wall, the top plate having a first side defining a primary heat transfer area and a second side facing the base tray such that the plurality of fluid channels are defined between a bottom surface of the base tray and the second side of the top plate, openings in the top plate positioned and shaped to receive the engaging members of the base tray,
   a plurality of ribs within fluid channels on each of an inlet side of the heat exchanger and an outlet side of the heat exchanger, and the ribs formed on a bottom surface of the base tray and extending from the bottom surface of the base tray toward the second side of the top plate, and
   first sealing members positioned along the perimeter formed by the engaging members, second sealing members positioned on a top surface of one or more of the plurality of ribs and in contact with the second side of the top plate, and the first sealing members and second sealing members compressed by folding of the engaging members over the top plate to form a fluid-tight seal between the base tray and top plate,
   wherein the top plate is comprised of a first thermally conductive material and the base tray is comprised of a second, non-thermally conductive material; and
   the heat generating components positioned within the enclosure and on the bottom wall including the top plate.

2. The heat exchanger assembly as claimed in claim 1, wherein:
   the plurality of ribs project out of the bottom wall of the base tray, wherein the plurality of ribs are disposed at spaced-apart intervals along the width of the base tray and wherein each of the plurality of fluid channels extend between an inlet end and an outlet end, and the plurality of ribs comprises a divider rib dividing the inlet end and outlet end, ribs forming an inlet manifold, and ribs forming an outlet manifold, and the plurality of ribs oriented to extend along a longitudinal axis of the heat exchanger assembly.

3. The heat exchanger assembly as claimed in claim 2, wherein the base tray further comprises:
   a fluid inlet passage extending through one of the sidewalls then through the bottom wall between an inlet end for inletting a heat exchange fluid into the heat exchanger and an outlet end for distributing the heat exchanger fluid to the inlet manifold area and the plurality of fluid channels; and
   a fluid outlet passage extending through the bottom wall then through one of the sidewalls between an inlet end in fluid communication with the outlet manifold area for discharging the heat exchange fluid from the plurality of fluid channels and an outlet end for discharging the heat exchanger fluid from the heat exchanger;
   wherein the inlet end of the fluid inlet passage and the outlet end of the fluid outlet passage extend away from a peripheral edge wall of the base tray and are configured for coupling with corresponding fluid fittings.

4. The heat exchanger assembly as claimed in claim 1, wherein a base tray peripheral flange area surrounds the fluid space within base tray, the engaging members surround the fluid space within base tray, and the top plate is positioned on the base tray peripheral flange area; and
   a sidewall peripheral flange extending away from an upper edge of the sidewalls such that the sidewall peripheral flange is disposed in a plane parallel to, or substantially parallel to, and spaced apart from the bottom wall of the base tray.

5. The heat exchanger assembly as claimed in claim 4, wherein the cover portion having a peripheral flange, the cover portion configured for disposition in sealing relationship with the base tray such that the peripheral flange of the cover portion is disposed in face-to-face sealing relationship with the sidewall peripheral flange, and
   the top plate is positioned between the cover portion and the bottom surface of the base tray, and the first side of the top plate and a bottom side of the cover portion defining an open interior space for housing the heat-generating components.

6. The heat exchanger assembly as claimed in claim 1, wherein the engaging members extend through the openings in the top plate, a distal end of the engaging members extends beyond the top plate, and the distal end of the engaging members is folded in a direction pointing away from the fluid space.

7. A heat exchanger assembly, comprising:
   an enclosure forming an open interior space receiving heat generating components, the enclosure comprising:
   sidewalls surrounding the open interior space;
   a cover portion positioned on a first end of the sidewalls;
   a bottom portion positioned on a second end of the sidewalls opposite the first end, the bottom portion comprising:
   a bottom wall extending between the sidewalls,
   a base tray defining a plurality of fluid channels in a fluid space extending outward from the bottom wall, the plurality of fluid channels extending between an inlet manifold area and an outlet manifold area for the flow of a heat exchange fluid, the plurality of fluid channels formed by a plurality of ribs extending from a base wall of the base tray, the base wall of the base tray forming the bottommost wall of the heat exchanger and the base wall supporting the heat exchanger, a base tray sidewall extending between the base wall and a bottom wall, a top plate positioned and supported by base tray and the ribs, the top plate sealing the fluid space from the open interior space, the top plate forming part of the bottom wall, the top plate having a first side defining a primary heat transfer area and a second side, opposite to the first side, for effecting a sealing relationship between the top plate and the base tray such that the plurality of fluid channels are defined between a bottom surface of the base tray and the second side of the top plate, and heat transfer enhancements disposed within each of the plurality of fluid channels, wherein the heat transfer enhancements comprise one of the following alternatives: turbulizers, offset strip fins or projections formed on the second side of the top plate such that when the top plate is disposed on the base tray, the projections extend from the second side of the top plate outward into the fluid channels;

the heat generating components positioned within the enclosure, and positioned on and supported by the bottom wall including the top plate;

a fluid inlet passage extending through one of the sidewalls then through the bottom wall to carry fluid from an exterior of the heat exchanger, through the enclosure, and into the fluid space;

a fluid outlet passage extending through the bottom wall then through one of the sidewalls to carry fluid from the fluid space, through the enclosure, and into the exterior of the heat exchanger; and engaging members form a perimeter around the fluid space within the base tray, the engaging members passing through openings in the top plate, and folding of the engaging members over the top plate compresses sealing members positioned between the base tray and the top plate to form a fluid-tight seal between the base tray and the top plate.

8. The heat exchanger assembly as claimed in claim 7, wherein the heat transfer enhancements are projections comprising the ribs disposed longitudinally and angled across the fluid channels, and each projection oriented at an opposite angle relative to a previous projection in the fluid channel.

9. The heat exchanger assembly as claimed in claim 8, further comprising heat transfer enhancement-receiving grooves disposed within the base tray and configured for receiving the projections extending from the second side of the top plate when the top plate is disposed on the base tray.

10. The heat exchanger assembly as claimed in claim 1, further comprising a sealing member disposed between the base tray and the top plate.

11. A heat exchanger assembly, comprising:
an enclosure defining an open interior space, the enclosure comprising:
a bottom portion, comprising:
a bottom wall,
a base tray comprising a cooling medium flow path area extending outward from the bottom wall, the base tray comprising a plurality of fluid channels formed by a plurality of ribs extending from a base wall of the base tray, the plurality of fluid channels extending between an inlet manifold area and an outlet manifold area for the flow of a heat exchange fluid through the heat exchanger, a base tray peripheral flange area extending from and surrounding the cooling medium flow path area, the base wall of the base tray forming the bottommost wall of the heat exchanger and the base wall supporting the heat exchanger, a base tray sidewall extending between the base wall and a bottom wall, and a top plate positioned on and supported by the base tray peripheral flange area and the ribs, the top plate sealing the cooling medium flow path area from the open interior space, the top plate forming part of the bottom wall, the top plate having a first side defining a primary heat transfer area for receiving one or more heat-generating components and a second side, opposite to the first side, for effecting a sealing relationship between the top plate and base tray peripheral flange area;

a sidewall with an end connected to the bottom wall, the sidewall extending away from the bottom wall and surrounding the bottom wall;

a cover portion positioned on an end of the sidewall distal from the bottom wall and in sealing relationship with the sidewall, the length of the sidewall forming the open interior space between the cover portion and the top plate, the cover portion having a sealing surface disposed in face-to-face sealing relationship with a peripheral flange of the sidewall;

the one or more heat generating components positioned within the enclosure and, positioned on and supported by the bottom wall including the top plate;

a first and a second fluid passage extending through the sidewall, extending through the bottom wall, and carrying fluid between an exterior of the heat exchanger and the cooling medium flow path area, the first and second fluid passages passing through the open interior space of the enclosure; and engaging members form a perimeter around the cooling medium flow path area within the base tray, the engaging members passing through openings in the top plate, and folding of the engaging members over the top plate compresses sealing members positioned between the base tray and the top plate to form a fluid-tight seal between the base tray and the top plate.

12. A system comprising the heat exchanger assembly of claim 11, wherein the one or more heat generating components are batteries positioned between the top plate and the cover portion.

13. The heat exchanger assembly of claim 1, further comprising connecting elements extending from the top surface of the plurality of ribs and passing through the first side and the second side of the top plate, and the connecting elements arranged in rows on the top plate corresponding to the ribs the connecting elements are connected to.

14. The heat exchanger assembly of claim 1, wherein a divider rib divides the plurality of fluid channels into an intake side and an outlet side, and a plurality of the ribs extends on each of the intake side and outlet side, the ribs form an intake manifold and an outlet manifold area on a first side of the heat exchanger, and the ribs form a transitional manifold on a second side of the heat exchanger opposite the first side.

15. The heat exchanger assembly of claim 7, wherein the plurality of ribs extend along the longitudinal axis of the heat exchanger assembly and contact the top plate.

16. The heat exchanger assembly of claim 11, wherein the plurality of ribs extend along the longitudinal axis of the heat exchanger assembly and support the second side of the top plate.

17. The heat exchanger assembly of claim 7, wherein the sealing members comprise first sealing members positioned along the perimeter formed by the engaging members and second sealing members positioned on a top surface of one or more of the plurality of ribs and in contact with the second side of the top plate.

* * * * *